(12) United States Patent
Takeda et al.

(10) Patent No.: US 11,012,982 B2
(45) Date of Patent: May 18, 2021

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP); Shaozhen Guo, Beijing (CN); Lihui Wang, Beijing (CN); Liu Liu, Beijing (CN); Xiaolin Hou, Beijing (CN); Huiling Jiang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/328,838

(22) PCT Filed: Aug. 30, 2017

(86) PCT No.: PCT/JP2017/031153
§ 371 (c)(1),
(2) Date: Feb. 27, 2019

(87) PCT Pub. No.: WO2018/043562
PCT Pub. Date: Mar. 8, 2018

(65) Prior Publication Data
US 2019/0215818 A1    Jul. 11, 2019

(30) Foreign Application Priority Data

Aug. 31, 2016  (JP) .............................. JP2016-170059
Sep. 29, 2016  (JP) .............................. JP2016-192332

(51) Int. Cl.
*H04W 4/00*    (2018.01)
*H04W 72/04*   (2009.01)
(Continued)

(52) U.S. Cl.
CPC ....... *H04W 72/0406* (2013.01); *H04W 28/04* (2013.01); *H04W 72/04* (2013.01);
(Continued)

(58) Field of Classification Search
None
See application file for complete search history.

(56) References Cited

U.S. PATENT DOCUMENTS 9,160,486 B2 * 10/2015 Ko ........................ H04B 7/0413
9,497,671 B2 * 11/2016 Wang .................... H04J 11/0069
(Continued)

FOREIGN PATENT DOCUMENTS

JP       2016-503970 A      2/2016

OTHER PUBLICATIONS

International Search Report issued in PCT/JP2017/031153, dated Nov. 21, 2017 (2 pages).
(Continued)

*Primary Examiner* — Gerald A Smarth
(74) *Attorney, Agent, or Firm* — Osha Bergman Watanabe & Burton LLP

(57) ABSTRACT

The present invention is designed so that the transmission of PUSCH can be controlled properly when the reference value for the timing for transmitting signals is controlled in radio base stations and/or user terminals. A user terminal, according to the present invention, has a receiving section that receives downlink control information (DCI), and a control section that controls transmission of an uplink (UL) shared channel that is scheduled by the DCI, and the control section controls the transmission of the UL shared channel based on a reference value that is configured for the timing for transmitting the UL shared channel.

6 Claims, 22 Drawing Sheets

DL SUBFRAME

UL SUBFRAME

(51) Int. Cl.
*H04W 72/12* (2009.01)
*H04W 28/04* (2009.01)

(52) U.S. Cl.
CPC ....... *H04W 72/12* (2013.01); *H04W 72/1289* (2013.01); *Y02D 30/70* (2020.08)

(56) References Cited

U.S. PATENT DOCUMENTS

| | | | |
|---|---|---|---|
| 9,844,036 B2* | 12/2017 | Seo | H04W 4/70 |
| 10,785,791 B1* | 9/2020 | Eyuboglu | H04L 1/1851 |
| 2013/0195041 A1* | 8/2013 | Papasakellariou | H04L 1/0038 370/329 |
| 2013/0336226 A1* | 12/2013 | Noh | H04W 72/0413 370/328 |
| 2014/0241318 A1* | 8/2014 | Zhong | H04W 74/0833 370/331 |
| 2015/0189648 A1* | 7/2015 | Suzuki | H04W 28/06 370/329 |
| 2015/0305000 A1 | 10/2015 | Nguyen et al. | |
| 2015/0365965 A1* | 12/2015 | Wu | H04L 1/1812 370/328 |
| 2016/0013902 A1 | 1/2016 | Cui et al. | |
| 2016/0192388 A1* | 6/2016 | Ekpenyong | H04L 1/1829 370/329 |

OTHER PUBLICATIONS

Written Opinion of the International Searching Authority issued in PCT/JP2017/031153, dated Nov. 21, 2017 (3 pages).
Samsung; "Overview of latency reduction operation with subframe TTI for FS1"; 3GPP TSG RAN WG1 Meeting #86, R1-166692; Gothenburg, Sweden, Aug. 22-26, 2016 (4 pages).
Samsung; "Overview of latency reduction operation with subframe TTI for FS2"; 3GPP TSG RAN WG1 Meeting #86, R1-166693; Gothenburg, Sweden, Aug. 22-26, 2016 (5 pages).
NTT DOCOMO, Inc.; "HARQ/Scheduling timing for FS2 with Shortened processing time for 1ms TTI;" 3GPP TSG RAN WG1 Meeting #86, R1-167367; Gothenburg, Sweden, Aug. 22-26, 2016 (5 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Extended European Search Report issued in counterpart European Patent Application No. 17846566.2, dated Mar. 13, 2020 (11 pages).
Samsung; "UL HARQ-ACK feedback procedure for latency reduction with subframe TTI"; 3GPP TSG RAN WG1 Meeting #86, R1-166698; Gothenburg, Sweden; Aug. 22-26, 2016 (3 pages).
Intel Corporation; "Latency reduction between UL grant and PUSCH"; 3GPP TSG RAN WG1 Meeting #84, R1-160426; St. Julian's, Malta; Feb. 15-19, 2016 (3 pages).

* cited by examiner

| UL/DL CONFIGURATION | SUBFRAME n | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

D: DL SUBFRAME
U: UL SUBFRAME
S: SPECIAL SUBFRAME

FIG. 2

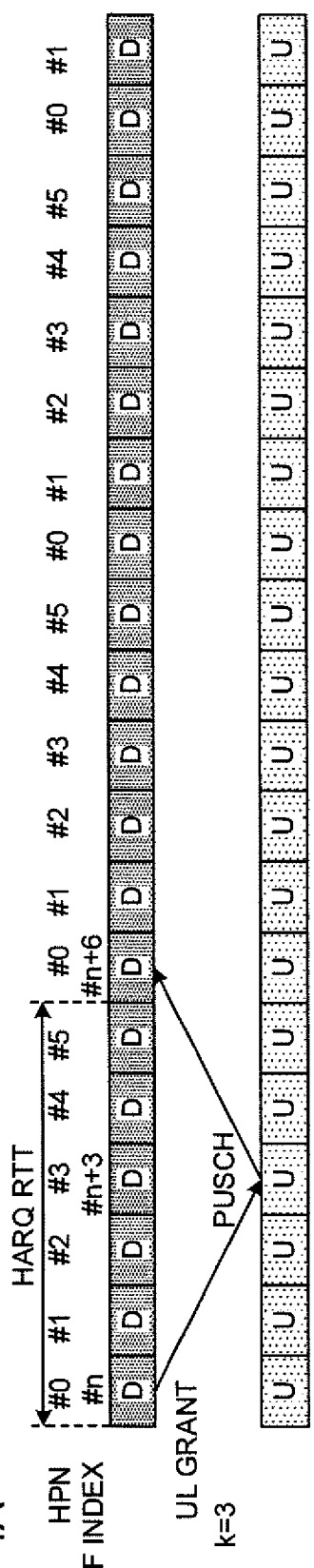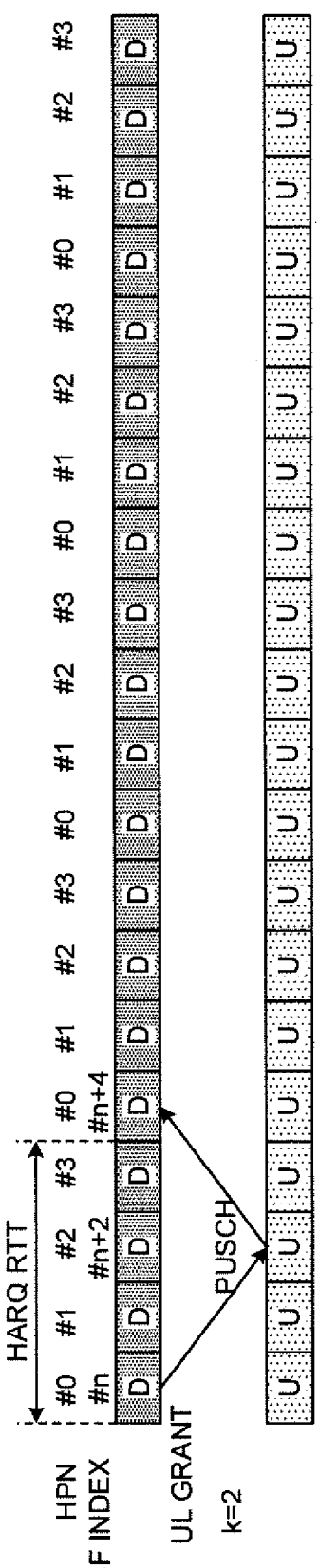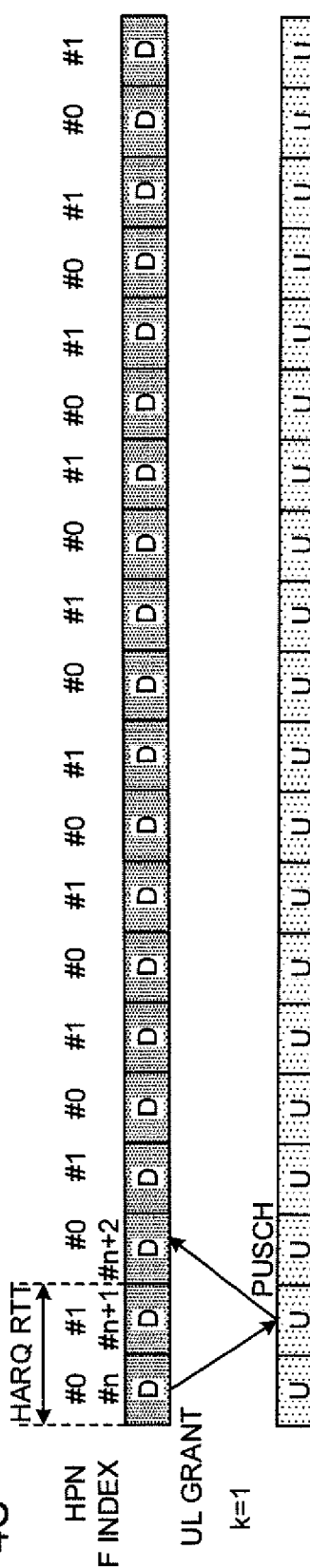

| VALUE OF k | NUMBER OF HARQ PROCESSES | BIT LENGTH OF HPN FIELD IN UL GRANT |
|---|---|---|
| 1 | 2 | 1 |
| 2 | 4 | 2 |
| 3 | 6 | 3 |
| 4 (CONVENTIONAL) | 8 | 3 |

FIG. 5

| UL/DL CONFIGURA-TION | SUBFRAME n | | | | | | | | | |
|---|---|---|---|---|---|---|---|---|---|---|
| | 0 | 1 | 2 | 3 | 4 | 5 | 6 | 7 | 8 | 9 |
| 0 | - | - | 6 | 3 | 3 | - | - | 6 | 3 | 3 |
| 1 | - | - | 3 | 3 | 3 | - | - | 3 | 3 | - |
| 2 | - | - | 3 | - | 3 | - | - | 3 | - | - |
| 3 | - | - | 3 | 3 | 3 | - | - | - | - | - |
| 4 | - | - | 3 | 3 | - | - | - | - | - | - |
| 5 | - | - | 3 | - | - | - | - | - | - | - |
| 6 | - | - | 6 | 4 | 4 | - | - | 6 | 3 | - | k=3 k=3
UL/DL CONFIGURATION 1

| UL/DL CONFIGURA-TION | SUBFRAME n | | | | | | | | | |
|---|---|---|---|---|---|---|---|---|---|---|
| | 0 | 1 | 2 | 3 | 4 | 5 | 6 | 7 | 8 | 9 |
| 0 | - | - | 2 | 2 | 3 | - | - | 2 | 2 | 3 |
| 1 | - | - | 2 | 2 | - | - | - | 2 | 2 | - |
| 2 | - | - | 2 | - | - | - | - | 2 | - | - |
| 3 | - | - | 3 | 3 | 3 | - | - | - | - | - |
| 4 | - | - | 2 | 2 | - | - | - | - | - | - |
| 5 | - | - | 2 | - | - | - | - | - | - | - |
| 6 | - | - | 3 | 3 | 3 | - | - | 2 | - | - | k=2 k=2

UL/DL CONFIGURATION 1

| UL/DL CONFIGURA-TION | 0 | 1 | 2 | 3 | 4 | 5 | 6 | 7 | 8 | 9 |
|---|---|---|---|---|---|---|---|---|---|---|
| 0 | - | - | 2 | 3 | - | - | - | 2 | 2 | 3 |
| 1 | - | - | 2 | 2 | - | - | - | 2 | 2 | - |
| 2 | - | - | 1 | - | - | - | - | 1 | - | - |
| 3 | - | - | 3 | 3 | 3 | - | - | - | - | - |
| 4 | - | - | 2 | 2 | - | - | - | - | - | - |
| 5 | - | - | 1 | - | - | - | - | - | - | - |
| 6 | - | - | 3 | 3 | - | - | - | 2 | 3 | - | k=1, SUBFRAME n

FIG. 9A

| k | | UL/DL CONFIGURATION | | | | | | |
|---|---|---|---|---|---|---|---|---|
| | | 0 | 1 | 2 | 3 | 4 | 5 | 6 |
| 3 | NUMBER OF HPN PROCESSES | 5 | 3 | 2 | 3 | 2 | 1 | 4 |
| | BIT LENGTH OF HPN FIELD | 3 | 2 | 1 | 2 | 1 | 1 | 2 |

FIG. 9B

| k | | UL/DL CONFIGURATION | | | | | | |
|---|---|---|---|---|---|---|---|---|
| | | 0 | 1 | 2 | 3 | 4 | 5 | 6 |
| 2 | NUMBER OF HPN PROCESSES | 3 | 2 | 1 | 3 | 2 | 1 | 3 |
| | BIT LENGTH OF HPN FIELD | 2 | 1 | 1 | 2 | 1 | 1 | 2 |

FIG. 9C

| k | | UL/DL CONFIGURATION | | | | | | |
|---|---|---|---|---|---|---|---|---|
| | | 0 | 1 | 2 | 3 | 4 | 5 | 6 |
| 1 | NUMBER OF HPN PROCESSES | 3 | 2 | 1 | 3 | 2 | 1 | 3 |
| | BIT LENGTH OF HPN FIELD | 2 | 1 | 1 | 2 | 1 | 1 | 2 |

| UL/DL CONFIGURA-TION | Subframe n | | | | | | | | | |
|---|---|---|---|---|---|---|---|---|---|---|
| | 0 | 1 | 2 | 3 | 4 | 5 | 6 | 7 | 8 | 9 |
| 0 | 3 | 3,6 | - | - | - | 3 | 3,6 | - | - | - |
| 1 | 3 | - | - | - | 3 | 3 | - | - | - | 3 |
| 2 | - | - | - | 3 | 3 | - | - | - | - | 3 |
| 3 | 3 | 3 | - | - | - | - | - | - | - | 3 |
| 4 | 3 | - | - | - | - | - | - | - | - | 3 |
| 5 | - | - | - | - | - | - | - | - | - | 3 |
| 6 | 4 | 6 | - | - | - | - | 6 | - | - | 4 | k=3

FIG. 10

|  | UL/DL CONFIGURA-TION | \multicolumn{10}{c|}{SUBFRAME n} |
| --- | --- | --- | --- | --- | --- | --- | --- | --- | --- | --- | --- |
|  |  | 0 | 1 | 2 | 3 | 4 | 5 | 6 | 7 | 8 | 9 |
| k=2 | 0 | 2 | 2,3 | - | - | - | 2 | 2,3 | - | - | 9 |
|  | 1 | 2 | 2 | - | - | - | 2 | 2 | - | - | - |
|  | 2 | 2 | - | - | - | - | 2 | - | - | - | - |
|  | 3 | 3 | 3 | - | - | - | - | - | - | - | 3 |
|  | 4 | 2 | 2 | - | - | - | - | - | - | - | - |
|  | 5 | 2 | - | - | - | - | - | - | - | - | - |
|  | 6 | 3 | 3 | - | - | - | 2 | 2 | - | - | - |

FIG. 11

| k=1 | UL/DL CONFIGURA-TION | SUBFRAME n | | | | | | | | | |
|---|---|---|---|---|---|---|---|---|---|---|---|
| | | 0 | 1 | 2 | 3 | 4 | 5 | 6 | 7 | 8 | 9 |
| | 0 | 2 | 2,3 | - | - | - | 2 | 2,3 | - | - | - |
| | 1 | 2 | 2 | - | - | - | 2 | 2 | - | - | - |
| | 2 | - | 2 | - | - | - | - | 1 | - | - | - |
| | 3 | 3 | 3 | - | - | - | - | - | - | - | 3 |
| | 4 | 2 | 2 | - | - | - | - | - | - | - | - |
| | 5 | - | 1 | - | - | - | - | - | - | - | - |
| | 6 | 3 | 3 | - | - | - | 2 | 2 | - | - | 3 |

| VALUE OF GIVEN FIELD IN DCI | HARQ |
|---|---|
| 0 | ASYNCHRONOUS |
| 1 | SYNCHRONOUS |

FIG. 14B

| VALUE OF GIVEN FILED IN DCI | VALUE OF k | HARQ |
|---|---|---|
| 00 | 4 | SYNCHRONOUS |
| 01 | 1 | ASYNCHRONOUS |
| 10 | 2 | |
| 11 | 3 | |

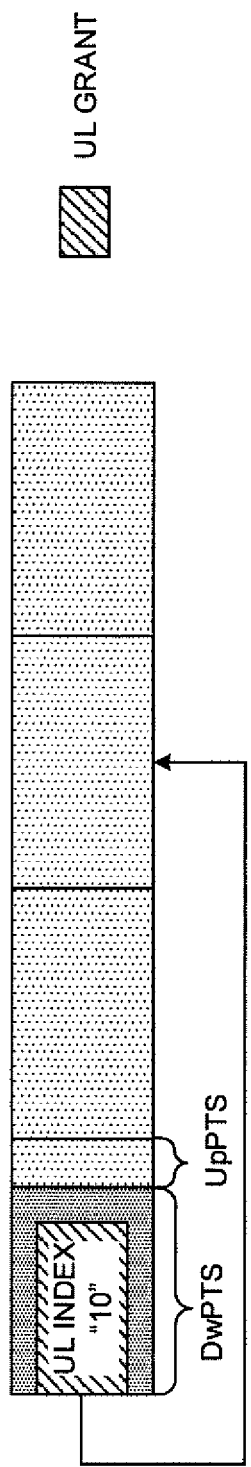
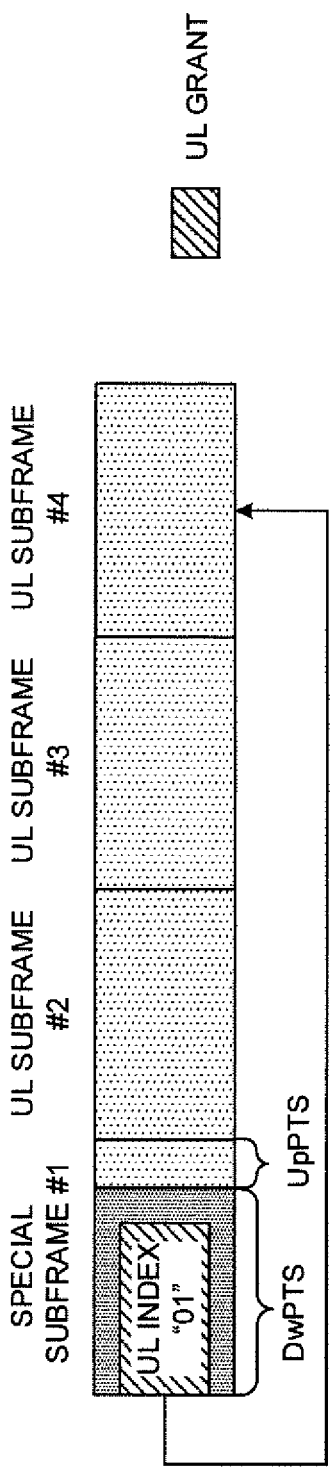
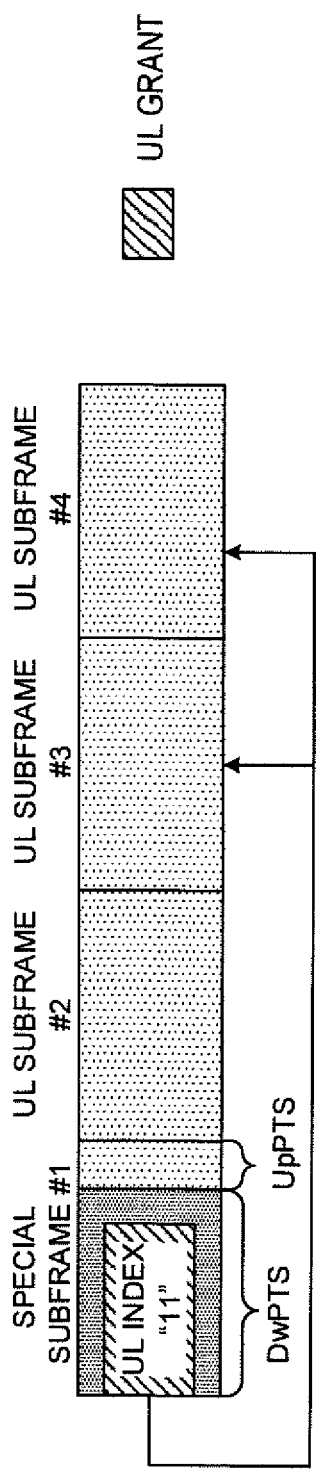

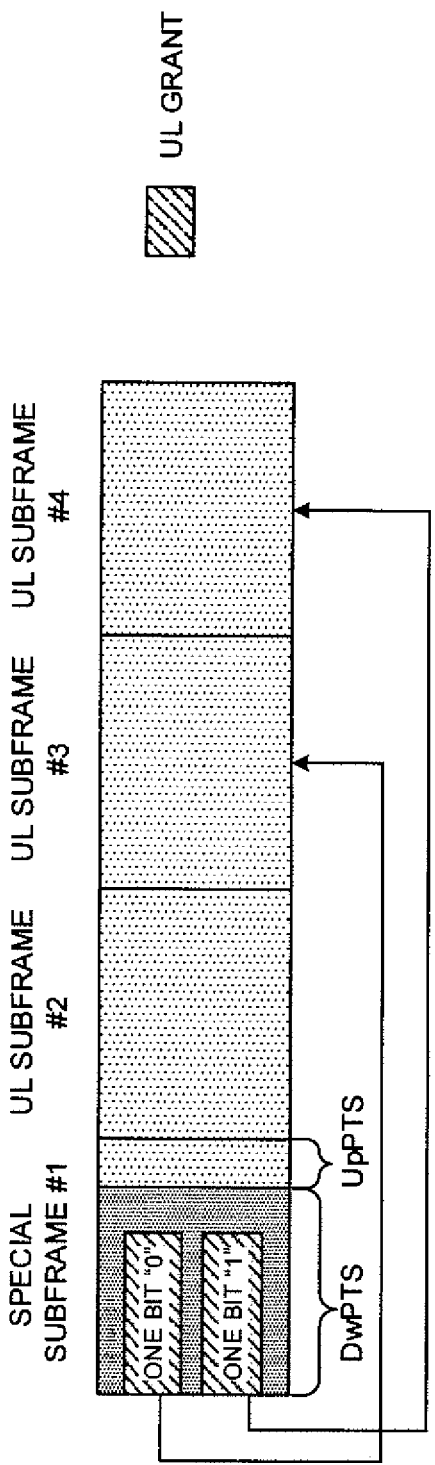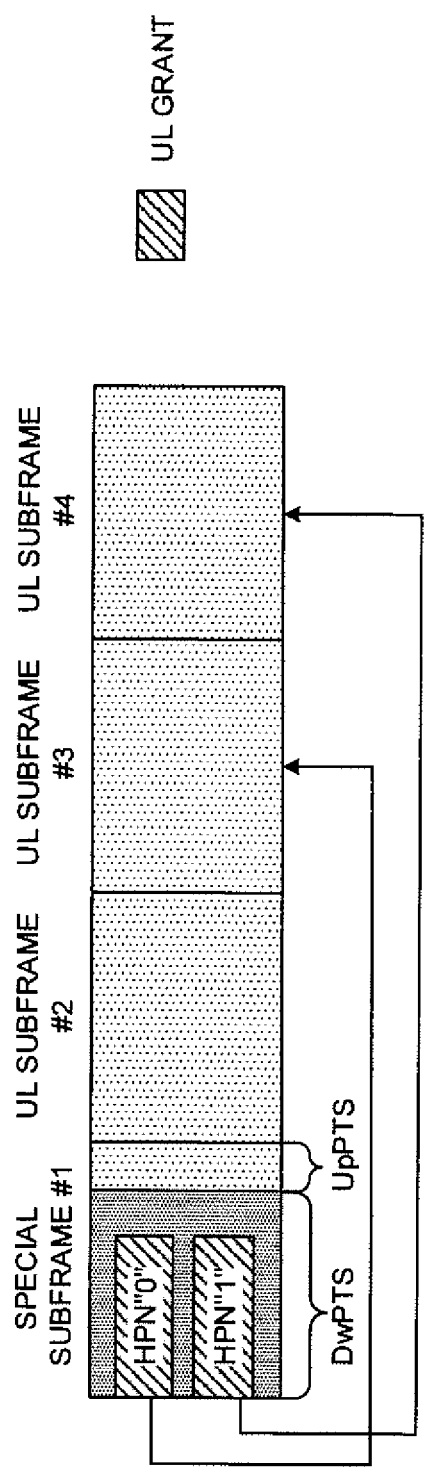
FIG. 22A
FIG. 22B

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long-term evolution (LTE) have been drafted for the purpose of further increasing high speed data rates, providing lower latency and so on (see non-patent literature 1). In addition, successor systems of LTE are also under study for the purpose of achieving further broadbandization and increased speed beyond LTE (referred to as, for example, "LTE-A (LTE-Advanced)," "FRA (Future Radio Access)," "4G," "5G," "5G+(plus)," "NR (New RAT)," "LTE Rel. 14," "LTE Rel. 15 (or later versions)," and/or the like).

In existing LTE systems (for example, LTE Rel. 8 to 13), downlink (DL) communication and/or uplink (UL) communication are carried out by using 1-ms transmission time intervals (TTIs) (also referred to as "subframes" and/or the like). This 1-ms TTI is the unit of time it takes to transmit one channel-encoded data packet, and is the processing unit in, for example, scheduling, link adaptation, retransmission control (HARQ (Hybrid Automatic Repeat reQuest)) and so on.

Also, in existing LTE systems (for example, LTE Rel. 8 to 13), frequency division duplex (FDD) and time division duplex (TDD) are supported as duplex schemes. FDD is a scheme to assign different frequencies to DL and UL, and is also referred to as "frame structure (FS) type 1 (FS 1)." TDD is a scheme to switch between DL and UL over time in the same frequency, and is also referred to as "frame structure type 2 (FS 2)." In TDD, communication is carried out based on UL/DL configurations, which define the formats of UL subframes and DL subframes in radio frames.

Also, in existing LTE systems (for example, LTE Rel. 8 to 13), the timing for scheduling a UL shared channel (for example, a physical uplink shared channel, which hereinafter will be referred to as "PUSCH") (hereinafter this timing will be also referred to as "UL scheduling timing" or the like) is controlled by downlink control information (hereinafter also referred to as "DCI," "UL grant," "UL DCI," or the like), by taking into account the signal processing time and the like in user terminals and/or radio base stations, and on assumption that the reference value for the timing for transmission is fixed at 4 ms.

For example, when FDD is used in existing LTE systems (for example, LTE Rel. 8 to 13), the PUSCH of subframe #n is scheduled by the UL grant of subframe #n−4, on assumption that the time it takes a user terminal to process the UL grant and/or others is 4 ms. Also, in TDD, the PUSCH in UL subframe #n is scheduled by the UL grant in subframe #n−4 or an earlier DL subframe, on assumption that the user terminal takes 4 ms of time to process the UL grant and/or others.

Also, in existing LTE systems (for example, LTE Rel. 8 to 13), the timing for transmitting retransmission control information in response to PUSCH (this timing will be also referred to as "UL HARQ timing" and/or the like) is also controlled on assumption that the reference value for the timing for signal transmission in user terminals and/or radio base stations is fixed at 4 ms (where the retransmission control information includes, for example, ACK (ACKnowledgement) or NACK (Negative ACK), A/N, HARQ-ACK and so forth, and hereinafter will be referred to as "A/N").

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall Description; Stage 2 (Release 8)," April, 2010

SUMMARY OF INVENTION

Technical Problem

Future radio communication systems (for example, LTE Rel. 14, 15 and later versions, 5G, NR and so forth) are required to reduce latency (also referred to as "latency reduction") in order to provide communication services having strict requirements on latency, such as URLLC. "Latency" as used herein collectively refers to the latency in the propagation time of signals (propagation delay) and the latency in the processing time of signals (processing delay).

As for the method of reducing these latencies, it may be possible to shorten the very processing unit for use for communication control (for example, scheduling and/or retransmission control) by introducing a new TTI (short TTI) that is shorter than a 1-ms subframe (TTI).

Meanwhile, even when 1-ms subframes are kept as processing units for controlling communication, it is still desirable to reduce latency. When keeping 1-ms subframes as processing units for communication control, it may be possible to configure the reference value for the timing for transmission short (for example, shorter than 4 ms) and control the time it takes to process signals in radio base stations and/or user terminals (the processing time, parameters related to the processing time, and so forth), in order to reduce latency.

However, as mentioned earlier, in existing LTE systems (for example, LTE Rel. 8 to 13), the timing for PUSCH scheduling by UL grants is controlled by fixing the reference value for the timing for transmission to 4 ms. Therefore, if, in a future radio communication system where this reference value may be controlled to be other values than 4 ms, a user terminal assumes the same scheduling timing as in existing LTE systems, there is a possibility that the transmission of PUSCH cannot be controlled properly.

The present invention has been made in view of the above, and it is therefore an object of the present invention to provide a user terminal and a radio communication method, whereby the transmission of PUSCH can be controlled properly even when the reference value for the timing for transmitting signals is controlled in the radio base station and/or the user terminal.

Solution to Problem

A user terminal, according to one aspect of the present invention, has a receiving section that receives downlink control information (DCI), and a control section that controls transmission of an uplink (UL) shared channel that is scheduled by the DCI, and the control section controls the transmission of the UL shared channel based on a reference value that is configured for the timing for transmitting the UL shared channel.

Advantageous Effects of Invention

According to the present invention, it is possible to control the transmission of PUSCH properly when the reference value for the timing for transmitting signals is controlled in radio base stations and/or user terminals.

BRIEF DESCRIPTION OF DRAWINGS

FIG. 2 is a diagram to show examples of UL/DL configurations;

FIGS. 4A to 4C are diagrams to show examples of PUSCH scheduling timings, according to a first aspect of the present invention FIG. 5 is a diagram to show examples of the number of HARQ processes and the number of HPN field bits, according to the first aspect;

FIGS. 9A to 9C are diagrams to show examples of the number of HARQ processes and the number of HPN field bits, according to the second aspect;

FIG. 10 is a diagram to show other examples of PUSCH scheduling timings with k=3, according to the second aspect;

FIG. 11 is a diagram to show other examples of PUSCH scheduling timing with k=2, according to the second aspect;

FIG. 12 is a diagram to show other examples of PUSCH scheduling timings of k=1 according to the second aspect;

FIGS. 14A and 14B are diagrams to show examples of dynamic and explicit signaling according to the third aspect;

FIGS. 21A to 21C are diagrams to show examples of UL grants that apply in common to a number of transmission timings, according to a fourth aspect of the present invention; and FIGS. 22A and 22B are diagrams to show examples of UL grants, provided on a per transmission timing basis, according to the fourth aspect.

DESCRIPTION OF EMBODIMENTS

Existing LTE systems (LTE Rel. 8 to 13) support hybrid automatic repeat request (HARQ) in order to prevent degradation of communication quality between user terminals (UE (User Equipment)) and radio base stations (eNode B (eNode B)).

For example, in the DL of existing LTE systems, a user terminal transmits an A/N in response to a PDSCH based on the result of the receipt of the PDSCH, by using a PUSCH or a PUCCH. A radio base station controls the transmission of the PDSCH (including initial transmission and/or retransmission) based on the A/N from the user terminal.

Also, in the UL of existing LTE systems, the user terminal transmits a PUSCH, which is scheduled by a UL grant from the radio base station. Based on the result of the receipt of the PUSCH, the radio base station transmits an A/N in response to the PUSCH by using a retransmission control channel (for example, a PHICH (Physical Hybrid-ARQ Indicator CHannel)). The user terminal controls the transmission of the PUSCH (including initial transmission and/or retransmission) based on the A/N from the radio base station.

In the DL and/or the UL (hereinafter referred to as "DL/UL") of existing LTE systems, the timing for A/N feedback (also referred to as "DL/UL HARQ timing" and/or the like) is controlled based on a predetermined reference value for the timing for transmission.

Also, in the UL of existing LTE systems, given a UL grant received in a subframe, the timing for PUSCH scheduling by the UL grant is controlled to be a predetermined period of time after the subframe in which this UL grant was received. For example, in FDD, a UL grant schedules a PUSCH in a subframe that is located 4 ms before the subframe in which the PUSCH is transmitted.

Figure 1:
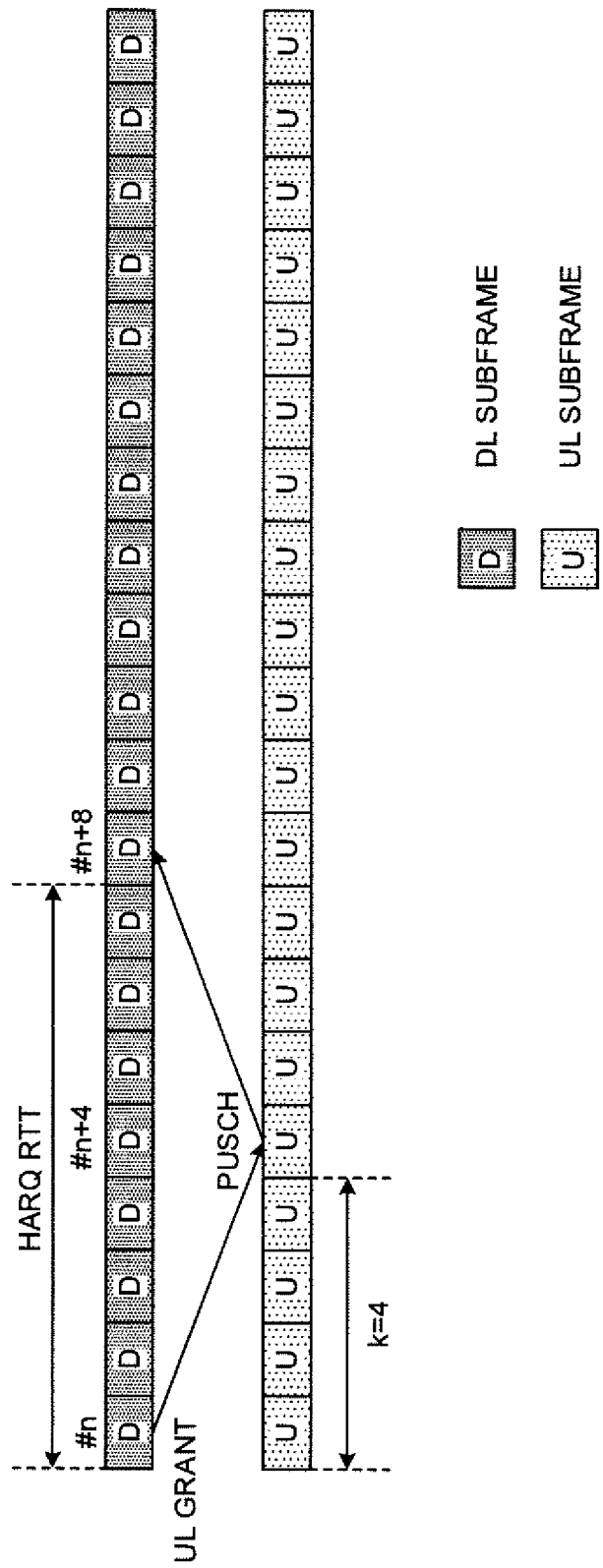
FIG. 1 is a diagram to show examples of PUSCH scheduling timings based on FDD.

FIG. 1 is a diagram to show examples of PUSCH scheduling timings based on FDD. As shown in FIG. 1, in FDD, when a user terminal receives a UL grant in subframe #n, the user terminal transmits a PUSCH to the radio base station in subframe #n+4, which is located 4 ms later. In principle, when receiving a PUSCH in subframe #n+4, the radio base station transmits an A/N in response to this PUSCH in subframe #n+8, which is located 4 ms after subframe #n+4.

Also, in HARQ, retransmission of data (transport block (TB) or code block (CB)) is controlled using processes (HARQ processes) as processing units. In a HARQ process of a given number (HARQ process number (HPN)), the same data keeps being retransmitted until an ACK is received. Also, in one subframe, one HARQ process is used. By implementing a plurality of HARQ processes in parallel, it is possible to transmit the data of the next HARQ process without waiting for an A/N in response to the previous HARQ process, so that the latency time is reduced.

For example, referring to FIG. 1, the HARQ process number (HPN) of the PUSCH that is scheduled by the UL grant of subframe #n becomes available again in subframe #n+8, which is located 8 ms later. In this way, the time it takes to be able to use the same HPN again (for example, the time from when data is scheduled until retransmission control information in response to this data can be transmitted) is also referred to as "round trip time (RTT)" (HARQ RTT).

As shown in FIG. 1, when FDD is used in existing LTE systems, the HARQ RTT is eight subframes (8 ms). Also, since the HARQ RTT is comprised of eight subframes, the maximum number of HARQ processes (also referred to as "the number of HARQ processes") is eight.

Meanwhile, when TDD is used in existing LTE systems, a PUSCH is scheduled by a UL grant in a DL subframe that is located 4 ms or more before the subframe in which the PUSCH is transmitted, on assumption that the time it takes the user terminal to process the UL grant is substantially the same as in FDD. In TDD, the timing for scheduling PUSCH is determined based on the UL/DL configuration in TDD.

FIG. 2 is a diagram to show examples of UL/DL configurations. As shown in FIG. 2, for TDD in existing LTE systems, seven frame structures—namely, UL/DL configurations 0 to 6—are defined, with varying ratios of UL subframes and DL subframes. Subframes #0 and #5 are allocated to the downlink, and subframe #2 is allocated to the uplink. Also, in UL/DL configurations 0, 1, 2, and 6, the point of change from DL subframes to UL subframes comes in a cycle of 5 ms, and, in UL/DL configurations 3, 4 and 5, the point of change from DL subframes to UL subframes comes in a cycle of 10 ms.

In UL/DL configurations 2, 3, 4 and 5 of FIG. 2, the ratio of DL subframes to UL subframes is configured to be relatively large (DL-centric). Note that a special subframe is a subframe for switching between DL and UL, and can be used primarily in DL communication. Hereinafter, a DL subframe and/or a special subframe will be referred to as a "DL/special subframe."

Figures 3A, 3B:
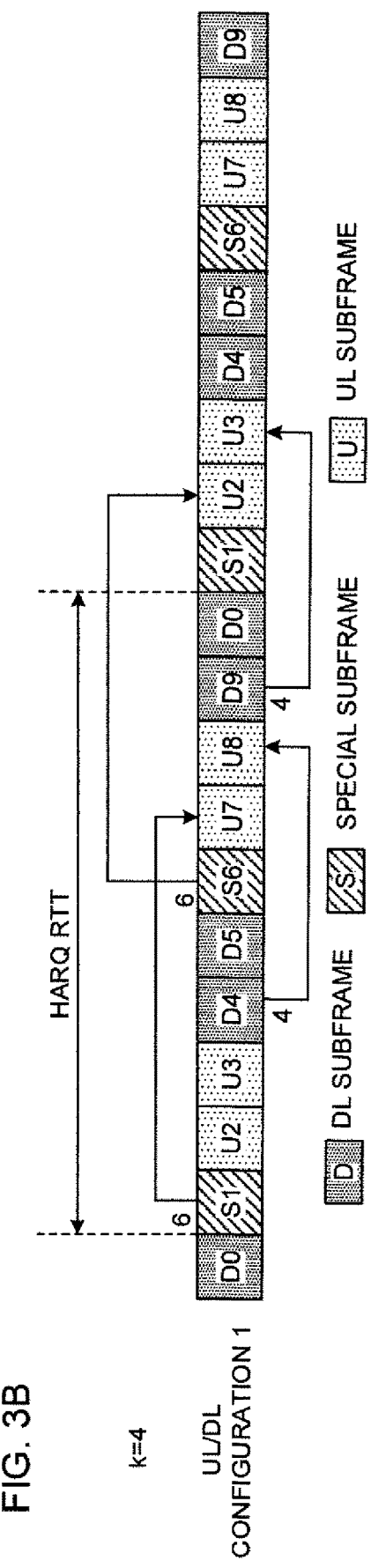
FIGS. 3A and 3B are diagrams to show examples of PUSCH scheduling timings based on TDD.

FIG. 3 are diagrams to show examples of PUSCH scheduling timings based on TDD. FIG. 3A shows the relationship between the DL/special subframe in which a UL grant is received, and the UL subframe in which the PUSCH scheduled by this UL grant is transmitted, for each UL/DL configuration.

To be more specific, FIG. 3A shows which UL subframe's PUSCH is scheduled in DL/special subframe #n (0≤n≤9) of each UL/DL configuration. FIG. 3A shows the values of k in the event DL/special subframe #n of each UL/DL configuration schedules the PUSCH of UL subframe #n+k (0≤n≤9), which is located k subframes later.

For example, depending on the value of k defined in UL/DL configuration 1 in FIG. 3A, as shown in FIG. 3B, in special subframe #1, the PUSCH in UL subframe #7, which is located six subframes later, is scheduled. Also, in DL subframe #4, the PUSCH in UL subframe #8, which is located four subframes later, is scheduled. In special subframe #6, the PUSCH in UL subframe #2, which is located six subframes later, is scheduled. In DL subframe #9, the PUSCH in UL subframe #3, which is located four subframes later, is scheduled.

Note that, although not illustrated, a table that shows in which DL/special subframe the PUSCH in UL subframe #n (0≤n≤9) in each UL/DL configuration is scheduled. This table may show the value of k in the event the PUSCH in UL subframe #n of each UL/DL configuration is scheduled in DL/special subframe #n−k, which is located k subframes before.

In this manner, in TDD, a UL subframe may not be present 4 ms after a UL grant is received in a DL/special subframe. Therefore, in the above table, the value of k is configured so that a PUSCH is scheduled in a DL subframe that is located four or more subframes before the subframe in which this PUSCH is transmitted.

Also, in TDD, the HARQ RTT and the maximum number of HARQ processes are configured to values to suit the UL/DL configuration, not fixed values (8) as in FDD. For example, as shown in FIG. 3B, in UL/DL configuration 1, the UL grant of special subframe #1 schedules the PUSCH of UL subframe #7, and an A/N in response to this PUSCH is transmitted in the PHICH of special subframe #1, which is located four subframes later.

In the case of FIG. 3B, the same HPN becomes available again in special subframe #1, which is located ten subframes after special subframe #1, so that the HARQ RTT is ten subframes. In this manner, in TDD, it is possible to say that the HARQ RTT is equal to the maximum value of k in each UL/DL configuration (6 in UL/DL configuration 1), plus four subframes. Also, the maximum number of HARQ processes is equal to the number of UL subframes in the HARQ RTT, and, as shown in FIGS. 3A and 3B, in UL/DL configuration 1, the maximum number of HARQ processes is four. The HARQ RTT and the number of HARQ processes in other UL/DL configurations are also configured likewise.

As described above, in existing LTE systems (Rel. 13 or earlier versions), the timing for PUSCH scheduling is controlled with fixed values, based on 4 ms (as a reference value).

Now, future radio communication systems (for example, LTE Rel. 14, 15 and later versions, 5G, NR, etc.) are required to reduce latency in order to provide communication services with strict requirements on latency, such as URLLC. "Latency" as used herein collectively refers to the latency in the propagation time of signals (propagation delay) and the latency in the processing time of signals (processing delay).

As for the method of reducing these latencies, it may be possible to shorten the very processing unit for use for communication control (for example, scheduling and/or retransmission control) by introducing a new TTI (short TTI) that is shorter than a 1-ms subframe (TTL).

Meanwhile, even when 1-ms subframes arekept as processing units for controlling communication, it is still desirable to reduce latency. This is because, if processing units for communication control are kept, existing channel formats (for example, PDSCH, DL control channels (PDCCH (Physical Downlink Control CHannel), EPDCCH (Enhanced Physical Downlink Control CHannel) and so on), PUSCH, PUCCH and/or other channels) can be reused.

When keeping 1-ms subframes as processing units for communication control, it may be possible to shorten the time it takes to process signals in radio base stations and/or user terminals, in order to reduce latency.

However, as described above, heretofore, in existing LTE systems (for example, LTE Rel. 8 to 13), the timing for PUSCH scheduling by UL grants has been controlled using predetermined values, with 4 ms being the reference value. Therefore, if the same scheduling timing as in existing LTE systems is applied to future radio communication systems where the processing time is likely to be much shorter than in existing LTE systems, there is a possibility that latency cannot be reduced adequately.

So, the present inventors have searched for a method that would control the transmission of PUSCH properly by presuming radio base stations and/or user terminals in which the processing time is shorter than in existing LTE systems, and arrived at the present invention. To be more specific, the present inventors have come up with the idea of controlling the transmission of PUSCH properly by controlling the timing for PUSCH scheduling based on reference values (for example, k) that are configured based on processing time and/or others.

Now, embodiments of the present invention will be described below in detail. In the following embodiments, a user terminal receives downlink control information (DCI) (hereinafter also referred to as a "UL grant," "UL DCI," and/or the like), and controls the transmission of the UL shared channel scheduled by this DCI (hereinafter also referred to as a "UL data channel," "UL data," "PUSCH," and/or the like). Also, the user terminal controls the transmission of PUSCH based on a reference value that is configured for the timing for transmission. This reference value may be the processing time, a parameter related to the processing time, and/or the like.

Furthermore, the herein-contained embodiments can be applied to FDD and/or TDD. Below, with the first aspect of the present invention, control of the timing for PUSCH scheduling in FDD will be described. Also, with a second aspect of the present invention, control of the timing for PUSCH scheduling in TDD will be described. Furthermore, with a third aspect of the present invention, control for switching the reference value for the timing for signal transmission in FDD and/or TDD will be described.

(First Aspect)

With the first aspect of the present invention, control of the timing for PUSCH scheduling in FDD will be described below. In the first aspect, a user terminal controls the reference value (k), which is calculated based on the processing time of signals in the user terminal and/or the radio base station, to be shorter than conventional 4 ms, and controls the timing for scheduling PUSCH based on this reference value.

To be more specific, the PUSCH in subframe #n+k' (k=k' in FDD), which is k' (the reference value) subframes after subframe #n in which a UL grant is received, may be scheduled by this UL grant of subframe #n. Alternatively, the UL grant of subframe #n−k', which is k' (the reference value) subframes before subframe #n in which a PUSCH is transmitted, in which a PUSCH is transmitted, may schedule the PUSCH of subframe #n.

<Scheduling Timing>

FIG. 4 is a diagram to show examples of PUSCH scheduling timings according to the first aspect. For example, in FIG. 4, when a user terminal receives a UL grant in subframe #n, the user terminal transmits a PUSCH in subframe #n+k, which is located the reference value k (k=1, 2 or 3) ms after this subframe #n.

FIG. 4A shows an example of k=3. In FIG. 4A, the user terminal transmits a PUSCH, which is scheduled by the UL grant of subframe #n, in subframe #n+3. The radio base station becomes capable of transmitting retransmission control information in response to the PUSCH of subframe #n+3 in subframe #n+6. Therefore, the HARQ RTT is six subframes.

FIG. 4B shows an example of k=2. In FIG. 4B, the user terminal transmits a PUSCH, which is scheduled by the UL grant of subframe #n, in subframe #n+2. The radio base station becomes capable of transmitting retransmission control information in response to the PUSCH of subframe #n+2 in subframe #n+4. Therefore, the HARQ RTT is four subframes.

FIG. 4C shows an example of k=1. In FIG. 4C, the user terminal transmits a PUSCH, which is scheduled by the UL grant of subframe #n, in subframe #n+1. The radio base station becomes capable of transmitting retransmission control information in response to the PUSCH of subframe #n+1 in subframe #n+2. Therefore, the HARQ RTT is two subframes.

<Maximum Number of HARQ Processes>

As shown in FIGS. 4A to 4C, in FDD, if the timing for PUSCH scheduling is controlled based on a reference value k for processing time, which is configured shorter than 4 ms of existing LTE systems (for example, k=1, 2 or 3 (ms)), the HARQ RTT becomes shorter in accordance with this reference value k. Therefore, the maximum number of HARQ processes can be controlled based on this reference value k. To be more specific, the smaller this reference value k, the smaller the maximum number of HARQ processes may be configured.

For example, as shown in FIG. 4A, in the event of k=3, the HARQ RTT is six subframes, and so the maximum number of HARQ processes may be six. Also, as shown in FIG. 4B, in the event of k=2, the HARQ RTT is four subframes, and so the maximum number of HARQ processes may be four. In the event of k=1, since the HARQ RTT is two subframes, the maximum number of HARQ processes may be two.

When the maximum number of HARQ processes is controlled based on the reference value k, the number of bits (bit length) in the HARQ process number (HPN) field in UL grants may be a value that corresponds to the maximum number of HARQ processes. Here, the HPN field serves as a field, in which information to show the HARQ process number (HPN) is stored, and as will be described later, may be included in UL grants when retransmission is controlled based on an asynchronous scheme.

FIG. 5 is a diagram to show examples of the number of HPN field bits according to the first aspect. When the reference value k becomes smaller, the maximum number of HARQ processes also become smaller, so that the number of HPN field bits (bit length) in UL grants may be reduced to suit the maximum number of HARQ processes. In this way, the overhead of UL grants can be reduced.

<PUSCH Retransmission Control>

As described above, when the timing for scheduling a PUSCH is controlled based on a reference value k for processing time, retransmission of this PUSCH may be controlled based on a synchronous scheme, in which HARQ processes and subframes (TTIs) are associated with each other in advance, or may be controlled based on an asynchronous scheme, in which HARQ processes and subframes (TTIs) are not associated with each other in advance.

Assuming that retransmission control is based on a synchronous scheme, when a UL grant in subframe #n schedules a PUSCH in subframe #n+k, a UL grant including retransmission control information in response to this PUSCH may be transmitted in subframe #n+2k, which is k subframes after subframe #n+k. This retransmission control information may contain information for identifying whether this is initially transmitted data (for example, a new data indicator (NDI)).

For example, if the NDI in the UL grant in subframe #n+2k is not toggled, the user terminal retransmits the UL data (PUSCH) of subframe #n having the same HARQ process number as that of subframe #n+2k. On the other hand, if the NDI in the UL grant in subframe #n+2k is toggled, the user terminal transmits new UL data (PUSCH).

In this way, when a UL grant contains retransmission control information (for example, an NDI) in synchronous scheme-based retransmission control, the user terminal can control retransmission of UL data, properly, without monitoring the PHICH. Therefore, in FDD, when the timing for scheduling a PUSCH is controlled based on a reference value k for processing time, which is configured shorter than 4 ms of existing LTE systems (for example, k=1, 2 or 3 (ms)), a user terminal that controls retransmission based on a synchronous scheme may not monitor (monitor or receive) for a PHICH in response to the PUSCH transmitted. In this case, the user terminal may control retransmission so that data (retransmitted data or new data) of an HARQ process is not transmitted before a UL grant is detected at the timing of the HARQ process corresponding to a PUSCH that has been transmitted. Note that the user terminal preferably keeps the data of this HARQ process, which has been transmitted, in a buffer, until the user terminal finds out that an NDI is toggled in the UL grant that schedules transmission for this HARQ process.

By contrast with this, when retransmission control is based on an asynchronous scheme, when a UL grant in subframe #n schedules a PUSCH in subframe #n+k, a UL grant to contain retransmission control information in response to this PUSCH may be transmitted in or after subframe #n+2k, which is located k subframes after subframe #n+k. This retransmission control information may contain an HPN field, which shows the HARQ process number (HPN), in addition to information for identifying whether this is initially transmitted data (for example, an NDI).

For example, when the NDI is not toggled in a UL grant that is detected in or after subframe #n+2k, the user terminal retransmits the UL data (PUSCH) of the HPN indicated in the HPN field in this UL grant. On the other hand, when the NDI is toggled in the UL grant in subframe #n+2k, the user terminal transmits new UL data (PUSCH) in this HPN. In asynchronous scheme-based retransmission control, retransmission of UL data can be controlled in a flexible way.

Now, according to the first aspect of the present invention described above, when, in FDD, the reference value k for the timing for transmitting signals in user terminals and/or radio base stations is controlled to be shorter than 4 ms, the transmission of PUSCH can be controlled properly based on scheduling timings that are determined based on this reference value k.

Also, according to the first aspect, the reference value k used to control the timing for PUSCH scheduling is lowered, so that latency can be reduced while keeping subframes (1-ms TTIs) as processing units in communication control. In addition, since the maximum number of HARQ processes can be reduced with the lowering of the reference value k, the overhead of UL grants due to HPN fields can be reduced.

(Second Aspect)

With a second aspect of the present invention, control of the timing for PUSCH scheduling in TDD will be described below. According to the second aspect, a user terminal controls the reference value k to be shorter than conventional 4 ms, and controls the timing for PUSCH scheduling based on this reference value k and UL/DL configurations.

To be more specific, the UL grant of DL/special subframe #n−k', which is located the reference value k or more before UL subframe #n, in which a PUSCH is transmitted, may schedule the PUSCH of UL subframe #n (this example of the nearest DL/special subframe located the reference value k or more earlier is by no means limiting). In other words, the PUSCH of UL subframe #n+k', located the reference value k or more after DL/special subframe #n, in which a UL grant is received, may be scheduled by the UL grant of DL/special subframe #n (this example of the nearest DL/special subframe located the reference value k or more later is by no means limiting).

Here, the value of k' to indicate the timing for PUSCH scheduling may be determined based on this reference value k and UL/DL configurations.

<Scheduling Timing>

FIG. 6 to FIG. 8 are diagrams to show examples of PUSCH scheduling timings according to the second aspect. In FIG. 6 to FIG. 8, a user terminal receives a UL grant of DL/special subframe #n−k', which is located the reference value k or more before UL subframe #n, and transmits the PUSCH scheduled by this UL grant in UL subframe #n. FIG. 6, FIG. 7 and FIG. 8 show cases where the reference value k is 3 ms, 2 ms and 1 ms, respectively.

Figures 6A, 6B:
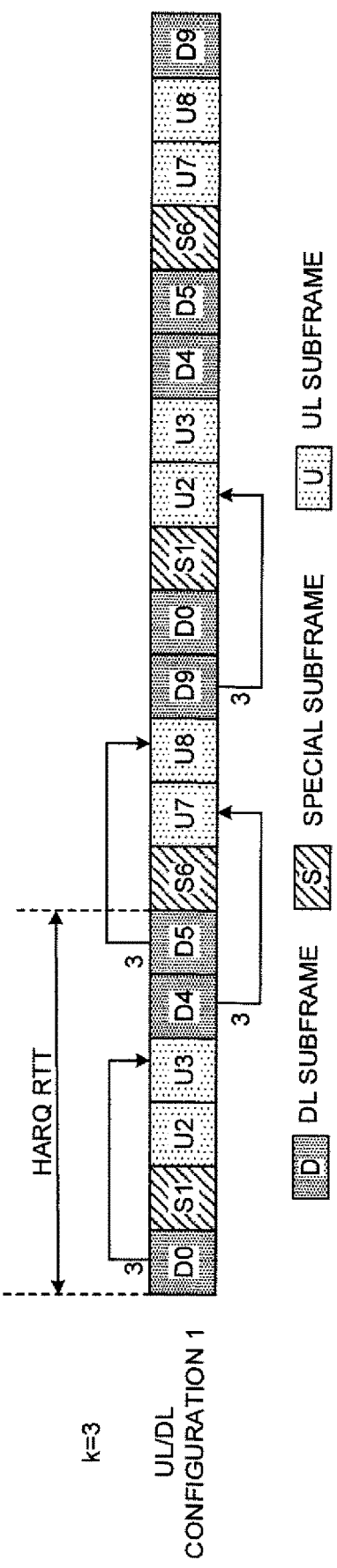
FIGS. 6A and 6B are diagrams to show examples of PUSCH scheduling timings with k=3, according to a second aspect of the present invention.
Figures 7A, 7B:
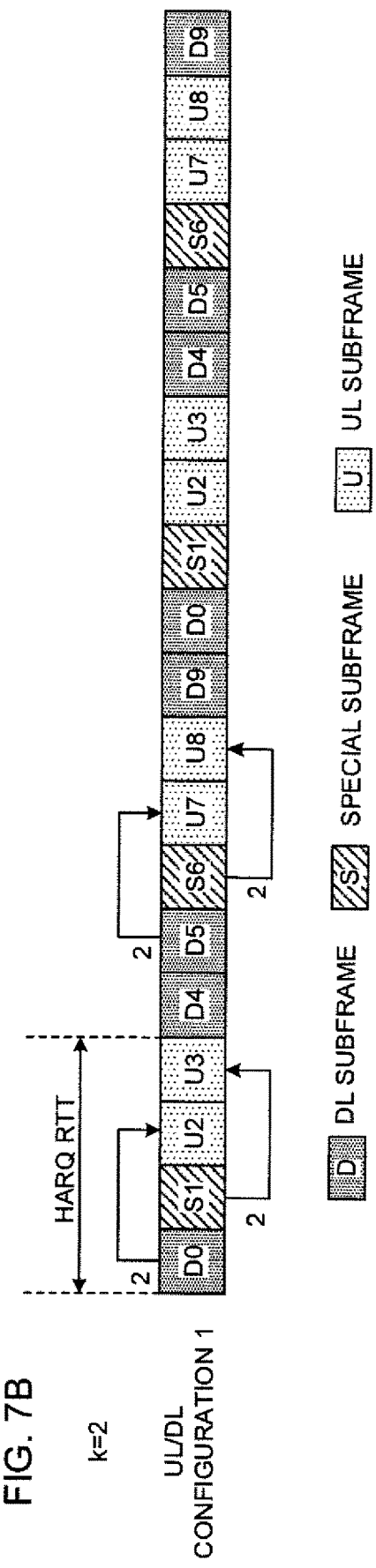
FIGS. 7A and 7B are diagrams to show examples of PUSCH scheduling timings with k=2, according to the second aspect.
Figures 8A, 8B:
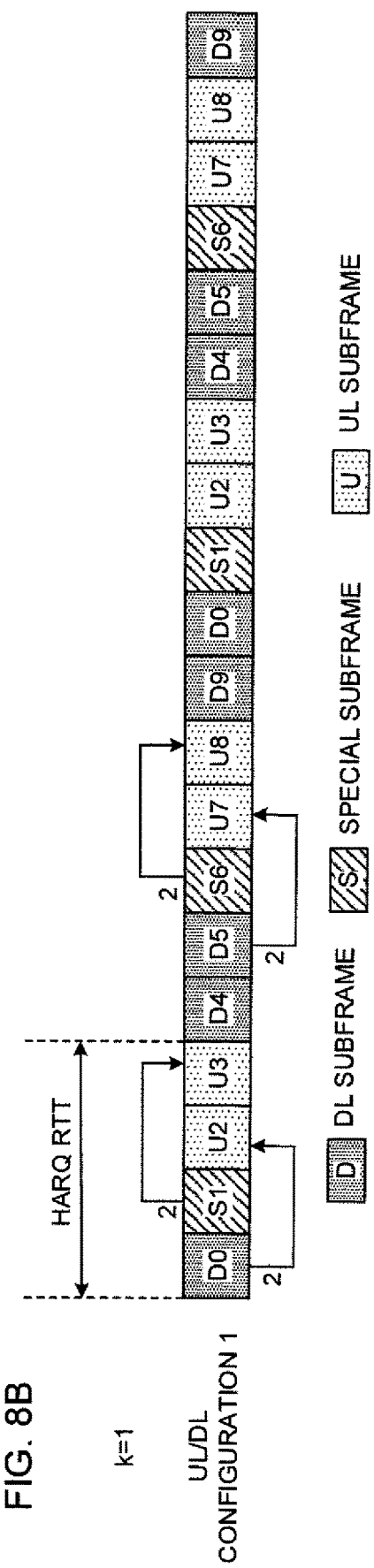
FIGS. 8A and 8B are diagrams to show examples of PUSCH scheduling timings with k=1, according to the second aspect.

The tables of FIG. 6A, FIG. 7A and FIG. 8A show, for each UL/DL configuration, by which DL/special subframe's UL grant the PUSCH of each UL subframe #n is scheduled. To be more specific, the tables shown in FIG. 6A, FIG. 7A, and FIG. 8A show, for each UL/DL configuration, the value of k' in the event the PUSCH in UL subframe #n is scheduled by the UL grant of DL/special subframe #n−k', which is located the reference value k (k=3, 2 and 1) or more before UL subframe #n.

For example, as shown in FIG. 6B, when the reference value is k=3, the PUSCH in UL subframe #3 of UL/DL configuration 1 is scheduled by the UL grant of DL subframe #0 (=n−k'=3−3), depending on the value of k' (=3) defined in FIG. 6A. Similarly, the PUSCHs in UL subframes #2, #7 and #8 are also scheduled by the UL grants of DL/special subframes specified by the value of k' in FIG. 7A.

Also, as shown in FIG. 7B, when the above reference value for processing time is k=2, the PUSCH in UL subframe #3 of UL/DL configuration 1 is scheduled by the UL grant of special subframe #1 (=n−k'=3−2), depending on the value of k' (=2) defined in FIG. 7A. Similarly, the PUSCHs in UL subframes #2, #7 and #8 are also scheduled by the UL grants of DL/special subframes specified by the value of k' in FIG. 7A.

Also, as shown in FIG. 8B, when the above reference value for processing time is k=1, the PUSCH in UL subframe #3 of UL/DL configuration 1 is scheduled by the UL grant of special subframe #1 (=n−k'=3−2), depending on the value of k' (=2) defined in FIG. 8A. Similarly, the PUSCHs in UL subframes #2, #7 and #8 are also scheduled by the UL grants of DL/special subframes specified by the value of k' in FIG. 8A.

In FIG. 8B, the nearest DL/special subframe that is located the reference value k (=1 ms) or more before UL subframe #2 is special subframe #1. Meanwhile, when the UL grant of special subframe #1 schedules the PUSCH of UL subframe #2, the PUSCH in UL subframe #3 cannot be scheduled. Therefore, the value of k' shown in FIG. 8A does not always have to point to the nearest DL/special subframe located the reference value k (=1 ms) or more before a PUSCH-transmitting UL subframe.

<Maximum Number of HARQ Processes>

As shown in FIG. 6 to FIG. 8, in TDD, when the timing for scheduling a PUSCH is controlled based on a reference value k, which is configured shorter than 4 ms of existing LTE systems (for example, k=1, 2 or 3 (ms)), the HARQ RTT may be controlled based on this reference value k and UL/DL configurations. Also, the maximum number of HARQ processes is equal to the number of UL subframes in the maximum HARQ RTT. Therefore, the maximum number of HARQ processes may also be controlled based on this reference value k and UL/DL configurations.

For example, when UL/DL configuration 1 is used and k=3 holds, as shown in FIG. 6B, the maximum period (maximum HARQ RTT) from a PUSCH scheduled for transmission at a predetermined timing until the PUSCH of the same HARQ process can be transmitted is six subframes (from U2 to U8, for example), so that the maximum number of HARQ processes may be three. Also, as shown in FIG. 7B, when UL/DL configuration 1 is used and k=2 holds, the maximum HARQ RTT is five subframes (from U2 to U7, for example), so that the maximum number of HARQ processes may be two. Furthermore, as shown in FIG. 8B, when UL/DL configuration 1 is used and k=1 holds, the maximum HARQ RTT is five subframes (from U2 to U7, for example), so that the maximum number of HARQ processes may be two.

When the maximum number of HARQ processes is controlled based on the reference value k for the signal processing time in the user terminal and/or the radio base station and UL/DL configurations, the number of HPN field bits (bit length) in a UL grant may be a value to match the maximum number of HARQ processes if a reference value k and a UL/DL configuration are given, may be a value to match the maximum value of HARQ processes among all the UL/DL configurations if a reference value k is given, or may be a fixed value (for example, four bits).

FIG. 9 provide diagrams to show examples of the maximum number of HARQ processes and the number of HPN field bits according to the second aspect. As shown in FIGS. 9A to 9C, the maximum number of HARQ processes can be determined based on the above-described reference value k and UL/DL configurations. If the UL/DL configuration is the same, the maximum number of HARQ processes to suit the value of k (k=1, 2 or 3) is less than or equal to the maximum number of HARQ processes in existing LTE systems (see FIG. 3A). Also, when the reference value k is the same, the maximum number of HARQ processes takes different values depending on UL/DL configurations.

Also, as shown in FIGS. 9A to 9C, the bit length of the HPN field in each UL/DL configuration may be an unfixed value that varies depending on the value of the reference value k and the maximum number of HARQ processes (the number of HARQ processes) in each UL/DL configuration. In this case, the overhead due to DL DCI can be reduced. Alternatively, the bit length of the HPN field may be a value that is determined based on the value of the reference value k, regardless of what UL/DL configuration applies. For example, referring to FIG. 9, the bit length of the HPN field can be set to three bits when k=3 holds and two bits when k=1 and k=2 hold. In this case, DCI's bit length can be fixed regardless of whether the UL/DL configuration changes or what control is applied, so that blind detection can be continued without making the DCI bit length uncertain even in the middle of ongoing control for changing the UL/DL configuration.

<PUSCH Retransmission Control>

As described above, when the timing for scheduling a PUSCH is controlled based on a reference value k, retransmission of this PUSCH may be controlled based on a synchronous scheme, in which HARQ processes and subframes (TTIs) are associated with each other in advance, or may be controlled based on an asynchronous scheme, in which HARQ processes and subframes (TTIs) are not associated with each other in advance.

Assuming that retransmission is controlled based on the synchronous scheme, when the PUSCH of subframe #n is scheduled, a UL grant to contain retransmission control information in response to this PUSCH may be transmitted in subframe #n+k, which is located the processing time reference value k ms after subframe #n. This retransmission control information may contain information to identify whether this is initially transmitted data (for example, a new data indicator (NDI)).

For example, if the NDI in the UL grant in subframe #n+k is not toggled, the user terminal retransmits the UL data (PUSCH) of the same HARQ process number as that of subframe #n in subframe #n+k+k'. On the other hand, if the NDI in the UL grant in subframe #n+k is toggled, the user terminal transmits new UL data (PUSCH) in subframe #n+k+k'.

In this way, when a UL grant contains retransmission control information (for example, an NDI) in synchronous scheme-based retransmission control, the user terminal can control retransmission of UL data, properly, without monitoring the PHICH of subframe #n+k. Therefore, in TDD, when the timing for scheduling a PUSCH is controlled based on a reference value k for processing time, which is configured shorter than 4 ms of existing LTE systems (for example, k=1, 2 or 3 (ms)), a user terminal that controls retransmission based on the synchronous scheme may not monitor (monitor or receive) for a PHICH in response to the PUSCH transmitted. In this case, the user terminal may control retransmission so that data (retransmitted data or new data) of an HARQ process is not transmitted before a UL grant is detected at the timing of the HARQ process corresponding to a PUSCH that has been transmitted. Note that the user terminal preferably keeps the data of this HARQ process, which has been transmitted, in a buffer, until the user terminal finds out that an NDI is toggled in the UL grant that schedules transmission for this HARQ process.

On the other hand, when retransmission is controlled based on the asynchronous scheme, when the PUSCH of subframe #n is scheduled, a UL grant to contain retransmission control information in response to this PUSCH may be transmitted in or after subframe #n+k, which is located the processing time reference value k ms after subframe #n. This retransmission control information may contain an HPN field, which shows the HARQ process number (HPN), in addition to information for identifying whether this is initially transmitted data (for example, an NDI).

For example, when the NDI is not toggled in a UL grant that is detected in subframe #n+k, the user terminal retransmits the UL data (PUSCH) of the HPN indicated in the HPN field in this UL grant, in subframe #n+k+k'. On the other hand, when the NDI is toggled in the UL grant in subframe #n+k, the user terminal transmits new UL data (PUSCH) in this HPN in subframe #n+k+k'. In asynchronous scheme-based retransmission control, retransmission of UL data can be controlled in a flexible way.

<Variation>

The tables shown in FIG. 6A, FIG. 7A, and FIG. 8A show, for each UL/DL configuration, the value of k' in the event the PUSCH in UL subframe #n is scheduled by the UL grant of DL/special subframe #n−k', which is located the reference value k or more before (k=3, 2 and 1). However, the tables to show the timing for PUSCH scheduling are not limited to these tables.

FIG. 10 to FIG. 12 are diagrams to show other examples of tables showing PUSCH scheduling timings. FIG. 10, FIG. 11, and FIG. 12 show cases where the above reference value k is 3 ms, 2 ms, and 1 ms, respectively.

The tables of FIG. 10, FIG. 11, and FIG. 12 show, for each UL/DL configuration, the value of k' in the event the UL grant of DL/special subframe #n schedules the PUSCH of UL subframe #n+k', which is k (the reference value)(k=3, 2 and 1)) or more subframes after subframe #n.

Now, according to the second aspect of the present invention described above, when, in TDD, the reference value k for the timing for transmitting signals in user terminals and/or radio base stations is controlled to be shorter than 4 ms, the transmission of PUSCH can be controlled properly based on scheduling timings k' that are determined based on this reference value k.

Also, according to the second aspect, the reference value k used to control the timing for PUSCH scheduling is lowered, so that latency can be reduced while keeping subframes (1-ms TTIs) as processing units in communication control. In addition, since the maximum number of HARQ processes can be reduced with the lowering of the reference value k, the overhead of UL grants due to HPN fields can be reduced.

(Third Aspect)

With a third aspect of the present invention, control for switching the reference value k and/or the retransmission control scheme will be described below. Note that the third aspect can be combined with the first and/or the second aspect.

In the third aspect, the reference value k and/or the retransmission control scheme (a synchronous scheme or an asynchronous scheme) described above may be specified explicitly by higher layer signaling and/or physical layer signaling, or may be specified implicitly.

<Semi-Static Signaling>

Figure 13:
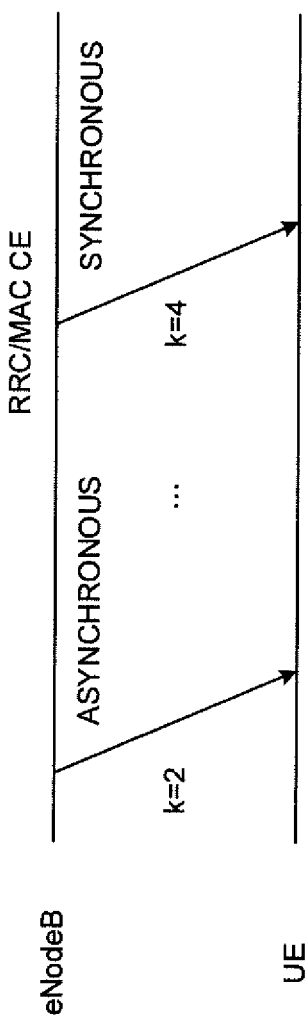
FIG. 13 is a diagram to show an example of semi-static signaling according to a third aspect of the present invention.

FIG. 13 is a diagram to show an example of semi-static signaling according to the third aspect. As shown in FIG. 13, the above-described reference value k for processing time and/or information that indicates the retransmission control scheme may be reported from a radio base station to a user terminal through higher layer signaling such as, for example, RRC (Radio Resource Control) signaling and/or MAC (Medium Access Control) signaling. The user terminal may determine the timing for scheduling a PUSCH based on the reference value k indicated by this information. In addition, the user terminal controls retransmission of the PUSCH based on the retransmission control scheme (for example, a synchronous scheme or an asynchronous scheme) specified by this information.

For example, referring to FIG. 13, after a reference value k (=2) that is shorter than that of existing LTE systems and asynchronous scheme-based retransmission control are configured, the same reference value k (=4) as that of existing LTE systems and synchronous scheme-based retransmission control are re-configured.

Note that, although not illustrated, it is possible to use the same assumed value k (=4) as that of existing LTE systems and/or synchronous scheme-based retransmission control up to a predetermined timing, such as the timing for gaining initial access based on random access procedures, and, after this predetermined timing (for example, after initial access is completed), reconfigure an assumed value k (for example, one of 1, 2 and 3) that is shorter than that of existing LTE systems and/or asynchronous scheme-based retransmission control.

Note that, when an RRC release or a radio link failure occurs, the value of k reported in higher layer signaling may be reset to the value of k for existing LTE. Furthermore, as for the value of k, the value of k in existing LTE may be used unless otherwise specified. By this means, even in an environment with poor conditions for communication, it is possible to restart from communication control for existing LTE.

<Dynamic and Explicit Signaling>

FIG. 14 are diagrams to show examples of dynamic and explicit signaling according to the third aspect. In DCI (for example, a UL grant) reported through physical layer signaling, an information field may be newly provided to indicate the above reference value k and/or the retransmission control scheme.

For example, FIG. 14A shows a one-bit information field that indicates the retransmission control scheme (for example, a synchronous scheme or an asynchronous scheme). If the value of this information field indicates the synchronous scheme, a user terminal may judge that the above reference value k is the same as that of existing LTE systems—that is, 4. On the other hand, if the value of this information field indicates the asynchronous scheme, the user terminal may judge that the reference value k is smaller than that of existing LTE systems—that is, k<4. In this way, the retransmission control schemes which the value of the information field might indicate and the reference value k may be associated with each other.

Meanwhile, FIG. 14B shows a two-bit information field that indicates the above-described reference value k for processing time. If the value of this information field indicates k=4, the user terminal may decide to control retransmission in the synchronous scheme. Also, if this value of the information field indicates k=1, 2, or 3, the user terminal may decide to control retransmission in the asynchronous scheme. In this way, the reference value k indicated by the value of the information field and the reference value k may be associated with each other.

<Dynamic and Implicit Signaling>

The reference value k and/or the retransmission control scheme described above may be specified implicitly based on a search space in which a PUSCH-scheduling UL grant is transmitted (detected). To be more specific, (1) when a UL grant is detected in a common search space (CSS), the user terminal may recognize that the reference value is k=4 and/or that retransmission is controlled based on the synchronous scheme.

When a UL grant is detected in the CSS, if FDD is used, the user terminal may control the transmission of the PUSCH of subframe #n based on the UL grant of subframe #n−4 (in other words, the user terminal may control the transmission of the PUSCH of subframe #n+4 based on the UL grant of subframe #n). Also, in subframe #n+4, which is located 4 ms after the PUSCH of subframe #n that is transmitted based on the UL grant of the CSS, the user terminal may control retransmission based on A/N that is received in the PHICH, or control retransmission based on retransmission control information (for example, an NDI) that is contained in a UL grant.

Meanwhile, similarly, when a UL grant is detected in the CSS, if TDD is used, the user terminal may control the transmission of the PUSCH of subframe #n based on the UL grant of subframe #n−k' (in other words, the user terminal may control the transmission of the PUSCH of subframe #n+k' based on the UL grant of subframe #n). k' is a value that is determined for each UL/DL configuration on assumption that the time the user terminal takes to process a UL grant is 4 ms (see, for example, FIG. 3A).

Also, if TDD is used, in subframe #n+$k_{PHICH}$, which is located $k_{PHICH}$ after the PUSCH of subframe #n is transmitted, the user terminal may control retransmission based on the A/N that is received in the PHICH, or control retransmission based on retransmission control information (for example, an NDI) that is contained in a UL grant. The value of $k_{PHICH}$ is determined per UL/DL configuration on assumption that the processing time of the PUSCH in the radio base station is 4 ms.

Also, (2) when a UL grant is detected in a UE-specific search space (USS), the user terminal may recognize that the reference value is k<4 (for example, k=1, 2 or 3) and/or that retransmission is controlled based on the synchronous scheme.

When a UL grant is detected in a USS, if FDD is used, the user terminal may control the transmission of the PUSCH of subframe #n based on the UL grant of subframe #n−k (in other words, the user terminal may control the transmission of the PUSCH of subframe #n+k based on the UL grant of subframe #n). Also, the user terminal may detect a UL grant, which contains retransmission control information (for example, an HPN, an NDI, an RV, etc.) in or after subframe #n+k, which is located k ms after the PUSCH of subframe #n that is transmitted based on the UL grant of the USS, and control retransmission based on the synchronous scheme.

Meanwhile, if TDD is used, the user terminal may control the transmission of the PUSCH of subframe #n based on the UL grant of subframe #n−k' (in other words, the user terminal may control the transmission of the PUSCH of subframe #n+k' based on the UL grant of subframe #n). k' is a value that is determined per UL/DL configuration based on the assumed value k (k<4) of the time it takes the user terminal to process a UL grant (see, for example, FIG. 6A, FIG. 7A, FIG. 8A, FIG. 10, FIG. 11 and FIG. 12).

Also, if TDD is used, in subframe #n+k'$_{HARQ}$, which is located k'$_{HARQ}$ after the PUSCH of subframe #n is transmitted, the user terminal may detect a UL grant that contains retransmission control information (for example, an HPN, an NDI, an RV, etc.) and control retransmission based on the asynchronous scheme. The value of k'$_{HARQ}$ is determined per UUDL configuration based on the reference value k (k<4) for the PUSCH in the radio base station. Note that, in asynchronous scheme-based retransmission control, when retransmission is made in subframe #n+k'$_{HARQ}$, the same HPN as that used upon the initial transmission of subframe #n is used.

Note that the above-described implicit signaling of the reference value k and/or the retransmission control scheme is not limited to when using the above-described search spaces. The size of a UL grant (DCI format) may implicitly indicate the reference value k and/or the retransmission control scheme.

Furthermore, in another way of signaling of the reference value k and/or the retransmission control scheme implicitly, assuming that the same UL grant (DCI format) is used, the aggregation level (AL) of control channel elements (CCEs) forming the search space may indicate the value of k implicitly. For example, if the AL of CCEs is 1 or 4, this may indicate k=4 and synchronous scheme-based retransmission control, and, if the AL of CCEs is 2 or 8, this may indicate k<4 and asynchronous scheme-based retransmission control. Also, k=4 and synchronous scheme-based retransmission control may be indicated if the AL of CCEs is an odd number, and k<4 and asynchronous scheme-based retransmission control may be indicated if the AL of CCEs is an even number.

Also, the above reference value k and/or retransmission control scheme may be indicated implicitly by the RNTI whereby CRC is scrambled. To be more specific, CRC may be scrambled using different RNTIs for each value of k.

Also, the transport block size (TBS) that is applied to the PUSCH may implicitly indicate the above reference value k and/or the retransmission control scheme.

(Fourth Aspect)

Now, with a fourth aspect of the present invention, control of PUSCH transmission in the event multiple PUSCH transmission (scheduling) timings (multiple values of k') are associated with UL grant-receiving subframe #n, in the tables described in the variation of the second aspect, will be described below.

Referring to the tables shown in FIG. 10, FIG. 11 and FIG. 12, of UL/DL configuration 0, a number of transmission timings k' are associated with receiving subframe #n. For example, when a UL grant is received in special subframe #1 of UL/DL configuration 0 in FIG. 12, PUSCHs are allowed to be transmitted in UL subframes #3 and #4, which are located 2 and 3 ms later.

When PUSCHs for multiple subframes can be scheduled by single subframe #n like this, the problem lies in how to design UL grants. Therefore, there is a demand for a UL grant format that is suitable for the case in which, in the above tables, a number of PUSCH transmission timings k' are associated with receiving subframe #n. Also, the user terminal needs to recognize which subframe's PUSCH is scheduled by the UL grant transmitted in this single subframe #n.

According to the fourth aspect, when a number of PUSCH transmission timings k' are associated with receiving subframe #n in the above tables, a UL grant that applies in common to these multiple transmission timings may be provided (first method), or UL grants may be provided on a per transmission timing basis (second method).

Also, in the fourth aspect, a user terminal may determine at least one of these transmission timings k' based on at least one of identification information in a UL grant, the HARQ process number in this UL grant, a prospective resource in which this UL grant is detected (the index of a potential DL control channel), and the aggregation level.

<First Method>

According to the first method, when a number of transmission timings k' are associated with receiving subframe #n in the above tables, the transmission of PUSCH is controlled using a UL grant that applies in common to these transmission timings k'.

FIG. 21 are diagrams to show examples of UL grants that each apply in common to a number of transmission timings, according to the fourth aspect. FIGS. 21 A to 21 C show cases where a single UL grant received in DL subframe #1 schedules the PUSCHs of UL subframe #3 and/or #4 based on the values of k', namely 2 and 3, in subframe #1 of UL/DL configuration 0 shown in FIG. 12.

The UL grants shown in FIGS. 21A to 21C each include identification information (UL index) that indicates which subframe's PUSCH the scheduling information that is contained relates to. To be more specific, in the tables shown in FIG. 10, FIG. 11, and FIG. 12, in which a number of transmission timings k' are associated with receiving subframe #n, a UL index indicates at least one of these transmission timings k'.

For example, as shown in FIG. 21A, when the UL grant of special subframe #1 schedules the PUSCH of UL subframe #3, the UL grant may include a UL index of "10," which indicates that the transmission timing k' in special subframe #1 of UL/DL configuration 0 in FIG. 12 is "2." That is, the most significant bit (also referred to as the "MSB," the "leftmost bit" and/or the like) in the two bits of the UL index may be configured to "1."

Also, as shown in FIG. 21B, when the UL grant of special subframe #1 schedules the PUSCH of UL subframe #4, the UL grant may include a UL index of "01," which indicates that the transmission timing k' in special subframe #1 of UL/DL configuration 0 in FIG. 12 is "3." That is, the least significant bit (also referred to as the "LSB," the "leftmost bit," and/or the like) in the two bits of the UL index may be configured to "1."

Also, as shown in FIG. 21C, when the UL grant of special subframe #1 schedules the PUSCHs of both UL subframes #3 and #4, the UL grant may include a UL index of "11," which indicates that the transmission timing k' in special subframe #1 of UL/DL configuration 0 in FIG. 12 is "2" and "3." That is, the MSB and the LSB of the two bits of the UL index may be configured to "1."

Here, the UL index may be placed by reusing the DAI (Downlink Assignment Indicator (Index)) field in the UL grant, or may be placed in a new information field. When a new information field is provided, a UL grant that is placed in this information field may be transmitted and received in terminal-specific search spaces (UE-specific search spaces), and a UL grant that is transmitted/received in the common search space may not have this information field. In this case, even if a configuration in which special subframes might schedule PUSCH transmission is applied to the user terminal via higher layer signaling and so on, the user terminal does not need to increase the number of times to perform blind decoding on the common search space, so that the power consumption of the terminal can be reduced.

Furthermore, although FIGS. 21A to 21C show examples in which a UL grant that schedules the PUSCH in UL subframe #3 or #4 is transmitted and received in special subframe #1, this is by no means limiting. This UL grant may be transmitted and received in other subframes (for example, subframes #9, #8, #7, #6 and/or others).

In addition, although FIGS. 21A to 21C show cases of communicating using one TDD carrier, the present invention may be enhanced and applied to uplink carrier aggregation (UL-CA), in which a number of uplink carriers are bundled and used.

In UL-CA, when uplink scheduling is performed per component carrier (CC) (that is, when cross-carrier scheduling is not performed or when CIF is not configured), scheduling is controlled using CC-specific UL grants, based on the above-described UL indices.

When UL-CA is used and uplink scheduling is performed across CCs (that is, when cross-carrier scheduling is performed or when CIF is configured), a UL index may be included in a UL grant depending on whether or not PUSCH transmission is configured in the UpPTS of the CC where the UL grant is transmitted (scheduling CC). In this case, if PUSCH transmission is configured in the UpPTS in the UL grant-transmitting CC (scheduling CC), a UL index field is provided in the UL grant even when PUSCH transmission is not configured in the UpPTS of the CC where PUSCH transmission is scheduled (scheduled CC). In this case, when the user terminal performs blind decoding on the UL grant in the scheduling CC, the user terminal does not have to keep in mind that UL grants are formed with different number of bits in every CC, so that it is not necessary to increase the number of times to perform blind decoding, and the power consumption can be reduced.

As described above, when the timing for PUSCH scheduling is determined based on the tables of FIG. 10, FIG. 11, and FIG. 12, and a number of transmission timings k' are associated with subframe #n of each UL/DL configuration, at least one of these transmission timings k' may be specified based on the configuration value of the UL index.

According to the first method, one or more subframes' PUSCHs can be scheduled with a single UL grant, so that the overhead due to UL grants and the processing load due to blind decoding in user terminals can be reduced.

<Second Method>

According to the second method, when a number of transmission timings k' are associated with receiving subframe #n in the above tables, the transmission of PUSCH is controlled by applying separate UL grants to these transmission timings W. That is, according to the second method, when PUSCHs are transmitted in a number of transmission timings (subframes), UL grants are provided on a per transmission timing basis.

FIG. 22 are diagrams to show examples of UL grants provided on a per transmission timing basis, according to the fourth aspect. FIGS. 22A and 22B show cases where two UL grants received in special subframe #1 schedule the PUSCHs of UL subframes #3 and #4 based on the values of k', namely 2 and 3, in special subframe #1 of UL/DL configuration 0 of FIG. 12.

As shown in FIG. 22A, UL grants that are provided on a per transmission timing basis may each contain identification information that identifies which transmission timing's (which subframe's) PUSCH is scheduled. For example, in FIG. 22A, the smaller the index of the subframe that is scheduled, the smaller the bit value of the identification information in the UL grant is configured.

Referring to FIG. 22A, when a number of transmission timings k' are associated with receiving subframe #n in the above tables, the identification information in UL grants can indicate the timing for transmission explicitly. Note that, in this identification information, existing information fields may be reused, or new information fields may be added.

Meanwhile, which transmission timing's (which subframe's) PUSCH is scheduled may be indicated in an implicit manner. In FIG. 22B, the HPN in each UL grant implicitly indicates the timing for transmitting PUSCH (transmitting subframe). For example, in FIG. 22B, it is determined in advance that the UL grant of the smaller HPN schedules the PUSCH of the smaller subframe index. The user terminal may recognize the timing to transmit the PUSCH based on the HPN field value in the UL grant.

Alternatively, the timing for transmitting the PUSCH (transmitting subframe) may be specified implicitly based on the prospective resource of the DL control channel where the UL grant is placed. For example, it may be determined in advance that a UL grant placed in an odd-numbered prospective resource in the search space schedules the PUSCH with the smaller subframe index, and a UL grant placed in an even-numbered prospective resource schedules the PUSCH with the larger subframe index. The user terminal may recognize the timing to transmit the PUSCH based on the prospective resource in which the UL grant is detected.

Alternatively, the timing for transmitting the PUSCH (transmitting subframe) may be specified implicitly based on the aggregation level (AL) of resource units (for example, CCEs (Control Channel Elements)) at which the UL grant is transmitted. For example, it may be determined in advance that a UL grant detected in a CCE of AL=1 or 4 schedules the PUSCH of the smaller subframe index, and a UL grant detected in a CCE of AL=2 or 8 schedules the PUSCH of the larger subframe index. The user terminal may recognize the timing to transmit the PUSCH based on the AL in which the UL grant is detected.

Alternatively, the timing for transmitting the PUSCH (transmitting subframe) may be designated implicitly based on parameters that are used to scramble (mask) the CRC appended to the UL grant. The user terminal may recognize the timing to transmit the PUSCH based on parameters used for CRC check of the UL grant.

FIGS. 22A and 22B show examples in which UL grants that schedule PUSCHs in UL subframe #3 or #4 are transmitted and received in special subframe #1, but this is by no means limiting. These UL grants may be transmitted and received in, for example, subframe #9, #8, #7, or #6.

In addition, although FIGS. 22A and 22B have shown cases of communicating using one TDD carrier, the present invention may be enhanced and applied to uplink carrier aggregation (UL-CA) in which a number of uplink carriers are bundled and used. In UL-CA, when uplink scheduling is performed per component carrier (CC) (that is, when cross-carrier scheduling is not performed or when no CIF is configured), the UL grant-based scheduling control that has been described earlier with the second method is implemented by using CC-specific UL grants.

When UL-CA is used and uplink scheduling is performed across CCs (that is, when cross-carrier scheduling is performed or when CIF is configured), the UL grant-based scheduling control that has been described earlier with the second method may be implemented depending on whether or not PUSCH transmission is configured in the UpPTS of the CC where the UL grant is transmitted (scheduling CC). In this case, if PUSCH transmission is configured in the UpPTS in the UL grant-transmitting CC (scheduling CC), the UL grant-based scheduling control that has been described earlier with the second method is implemented even when PUSCH transmission is not configured in the UpPTS of the CC where PUSCH transmission is scheduled (scheduled CC). In this case, when the user terminal performs blind decoding on the UL grant in the scheduling CC, the user terminal does not have to keep in mind that UL grants are formed with different number of bits in every CC, so that it is not necessary to increase the number of times to perform blind decoding, and the power consumption can be reduced.

Alternatively, when cross-carrier scheduling and the second method are used, the demodulation of UL grants may be controlled differently depending on whether or not PUSCH transmission is configured in the UpPTS in CCs where PUSCH transmission is scheduled (scheduled CCs). In this case, the user terminal only needs to optimize the control for the demodulation of UL grants only in CCs where PUSCH transmission is actually configured in the UpPTS, so that it is possible to prevent the processing load from increasing, and reduce the power consumption.

According to the second method, the UL grant provided at each transmission timing can schedule PUSCHs in one or more subframes, so that existing DCI formats can be reused.

As described above, according to the fourth aspect, even when a number of PUSCH transmission timings (multiple values of k') are associated with UL grant-receiving subframe #n in the tables (FIG. 10, FIG. 11 and FIG. 12) described in the variation of the second aspect, it is still possible to control the transmission of PUSCH properly.

(Others)

Although the second aspect above has described examples of PUSCH scheduling timings in the event existing UL/DL configurations 0 to 6 are used, even when UL/DL configurations 0 to 6 that are different from existing ones are used, the present embodiment is still applicable if the value of k' in the tables shown in FIG. 6A, FIG. 7A, FIG. 8A, FIG. 10, FIG. 11, and FIG. 12 is changed as appropriate.

Also, in the dynamic signaling described in the third aspect, explicit signaling and implicit signaling may be combined depending on UL/DL configurations. For example, in UL/DL configurations 4 and 5 where the proportion of DL subframes is relatively large compared to UL subframes, the information field in DCI may indicate the value of k explicitly. Also, in the rest of UL/DL configurations 0 to 3 and 6, k may be specified implicitly.

Also, although cases have been described above with the first to third aspects where the reference value k is controlled when 1-ms TTIs (subframes) are used, the first to third aspects can be also properly applied to cases where the reference value k is not a fixed value but is an unfixed value when short TTIs, which are shorter than 1 ms, are used.

In addition, the above-described control of the timing for PUSCH scheduling based on reference values k can also be used to control the timing for reporting channel state information (CSI) aperiodically.

In addition, in the tables that have been described in the variation of the second aspect (for example, FIG. 10, FIG. 11 and FIG. 12), PUSCH transmission (scheduling) timings (k) that are associated with UL grant-receiving subframe #n (#0 to #9) are configured not to designate overlapping UL subframes or special subframes, but this is by no means limiting. For example, the tables may be defined so that PUSCH transmission timings k that are associated with subframe #rt, in which a UL grant is received, indicate overlapping UL subframes or special subframes.

Even when PUSCH transmission timings k that are associated with subframe #n, in which a UL grant is received, point to overlapping UL subframes or special subframes, the radio base station can explicitly or implicitly indicate in which subframe the PUSCH is scheduled, as explained in the first and second methods of the fourth aspect, so that it is possible to prevent UL grants received in a number of different subframes from scheduling the PUSCH of the same subframe.

In this way, when the timing k for PUSCH transmission is allowed to indicate overlapping UL subframes or special subframes between subframes #n where UL grants are received, it is possible to improve the flexibility of scheduling in the radio base station.

(Radio Communication System)

Now, the structure of a radio communication system according to the present embodiment will be described below. In this radio communication system, the radio communication methods according to the above-described embodiments are employed. Note that the radio communication method according to each embodiment described above may be used alone or may be used in combination.

Figure 15:
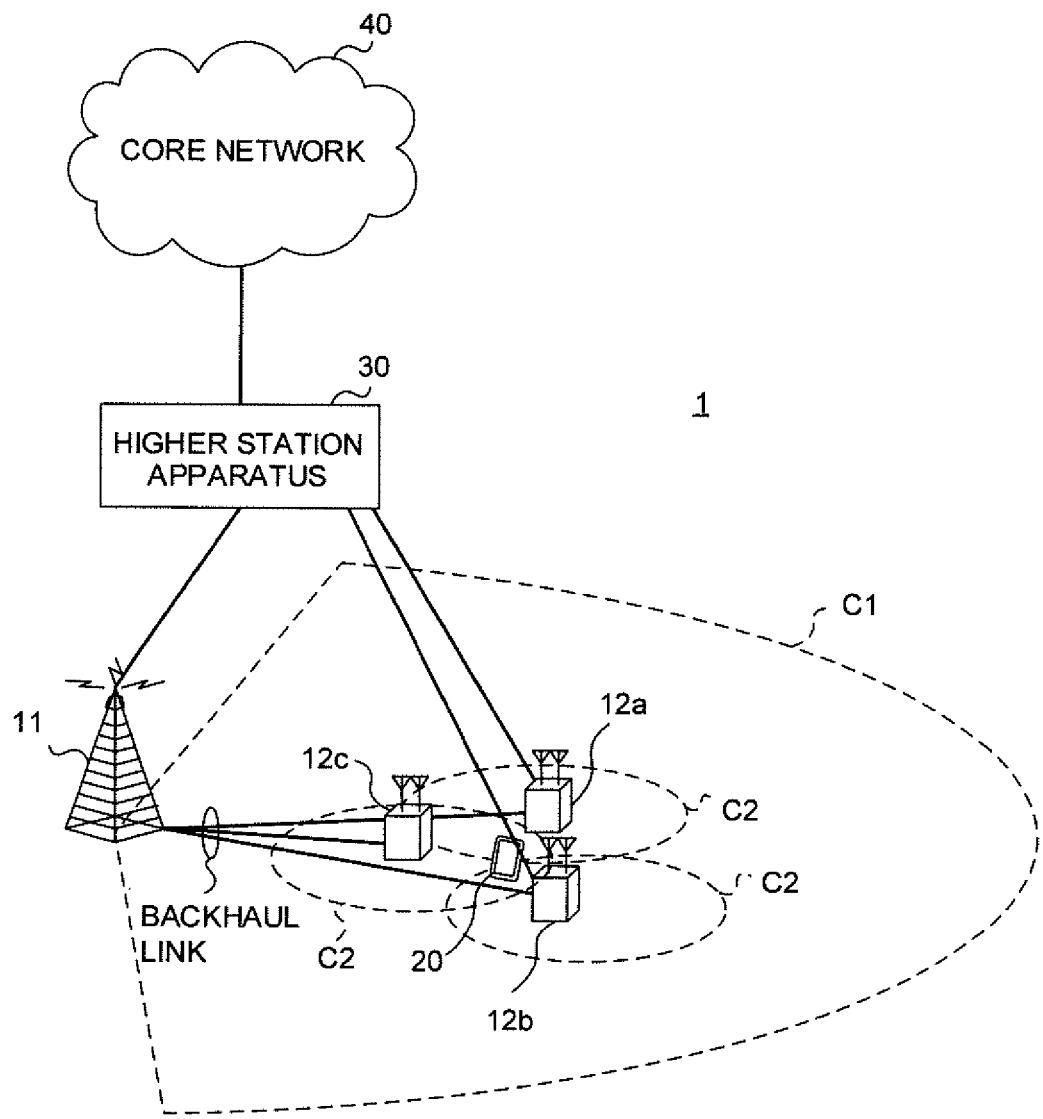
FIG. 15 is a diagram to show an exemplary schematic structure of a radio communication system according to the present embodiment.

FIG. 15 is a diagram to show an exemplary schematic structure of a radio communication system according to the present embodiment. A radio communication system 1 can adopt carrier aggregation (CA), which groups a number of fundamental frequency blocks (component carriers (CCs)) into one, using LTE system bandwidth (for example, 20 MHz) as one unit, and/or dual connectivity (DC), which uses a plurality of cell groups (CGs) that each accommodate one or more CCs. Note that the radio communication system 1 may be also referred to as "SUPER 3G," "LTE-A (LTE-Advanced)," "IMT-Advanced," "4G," "5G," "FRA (Future Radio Access)," "NR (New RAT (New Radio Access Technology))," and so on.

The radio communication system 1 shown in FIG. 15 includes a radio base station 11 that forms a macro cell C1, and radio base stations 12a to 12c that are placed within the macro cell C1 and that form small cells C2, which are narrower than the macro cell C1. Also, user terminals 20 are placed in the macro cell C1 and in each small cell C2. A structure in which different numerologies are applied between cells and/or within cells may be adopted here.

The user terminals 20 can connect with both the radio base station 11 and the radio base stations 12. The user terminals 20 may use the macro cell C1 and the small cells C2, which use different frequencies, at the same time, by means of CA or DC. Also, the user terminals 20 can execute CA or DC by using a plurality of cells (CCs) (for example, two or more CCs). Furthermore, the user terminals can use licensed-band CCs and unlicensed-band CCs as a plurality of cells.

Furthermore, the user terminals 20 can communicate based on time division duplexing (TDD) or frequency division duplexing (FDD) in each cell. A TDD cell and an FDD cell may be referred to as a "TDD carrier (frame structure type 2)" and an "FDD carrier (frame structure type 1)," respectively.

Furthermore, in each cell (carrier), a single numerology may be employed, or a plurality of different numerologies may be employed. As used herein, "numerology" refers to frequency-domain and time-domain parameters, such as subcarrier spacing, symbol duration, cyclic prefix duration, subframe duration and so on.

Between the user terminals 20 and the radio base station 11, communication can be carried out using a carrier of a relatively low frequency band (for example, 2 GHz) and a narrow bandwidth (referred to as, for example, an "existing carrier," a "legacy carrier," and/or the like). Meanwhile, between the user terminals 20 and the radio base stations 12, a carrier of a relatively high frequency band (for example, 3.5 GHz, 5 GHz, 30 to 70 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNo-deB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals or stationary communication terminals. Furthermore, the user terminals 20 can perform device-to-device (D2D) communication with other user terminals 20.

In the radio communication system 1, as radio access schemes, OFDMA (orthogonal Frequency Division Multiple Access) can be applied to the downlink (DL), and SC-FDMA (Single-Carrier Frequency Division Multiple Access) can be applied to the uplink (UL). OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to the combination of these, and OFDMA may be used in the UL.

DL channels that are used in the radio communication system 1 include a DL shared channel that is shared by each user terminal 20 (also referred to as "PDSCH (Physical Downlink Shared CHannel)," "DL data channel" and so forth), a broadcast channel (PBCH (Physical Broadcast CHannel)), L1/L2 control channels and so on. User data, higher layer control information, SIBs (System Information Blocks) and so forth are communicated in the PDSCH. Also, the MIB (Master Information Block) is communicated in the PBCH.

The L1/L2 control channels include DL control channels (such as PDCCH (Physical Downlink Control CHannel), EPDCCH (Enhanced Physical Downlink Control CHannel), etc.), PCFICH (Physical Control Format Indicator CHannel), PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. The EPDCCH is frequency-division-multiplexed with the PDSCH and used to communicate DCI and so on, like the PDCCH. Retransmission control information (for example, at least one of MN, NDI, HPN, and redundancy version (RV)) pertaining to UL signals (for example, PUSCH) can be communicated using at least one of the PHICH, the PDCCH, and the EPDCCH.

UL channels that are used in the radio communication system 1 include a UL shared channel that is shared by each user terminal 20 (also referred to as "PUSCH (Physical Uplink Shared CHannel)," "UL data channel" and/or the like), a UL control channel (PUCCH (Physical Uplink Control CHannel)), a random access channel (PRACH (Physical Random Access CHannel)) and so on. User data, higher layer control information and so on are communicated by the PUSCH. Uplink control information (UCI), including at least one of retransmission control information (for example, A/N) for DL signals (for example, PDSCH), channels state information (CSI), and a scheduling request (SR) is communicated in the PUSCH or the PUCCH. By means of the PRACH, random access preambles for establishing connections with cells are communicated.

(Radio Base Station)

Figure 16:
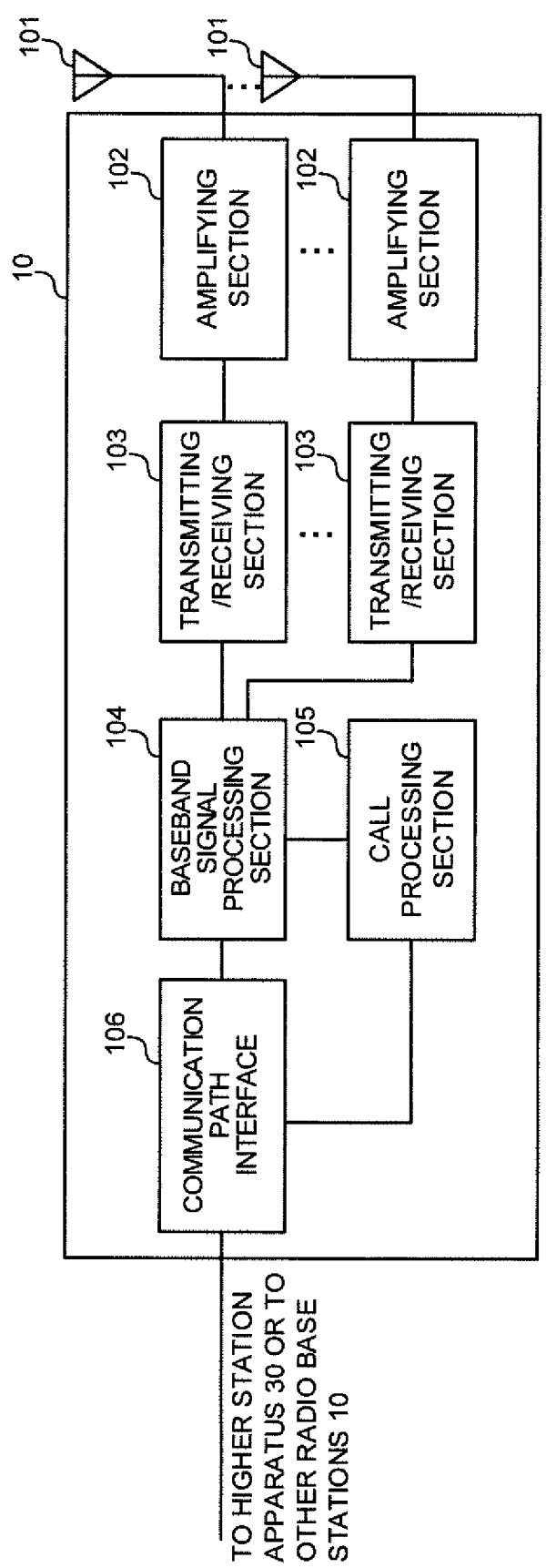
FIG. 16 is a diagram to show an exemplary overall structure of a radio base station according to the present embodiment.

FIG. 16 is a diagram to show an exemplary overall structure of a radio base station according to the present embodiment. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 is input from the higher station apparatus 30 to the baseband signal processing section 104, via the communication path interface 106.

In the baseband signal processing section 104, the user data is subjected to transmission processes, including a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to the transmitting/receiving sections 103. Furthermore, downlink control signals are also subjected to transmission processes such as channel coding and an inverse fast Fourier transform, and forwarded to the transmitting/receiving sections 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101.

A transmitting/receiving section 103 can be constituted by a transmitters/receiver, a transmitting/receiving circuit or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for UL signals, radio frequency signals that are received in the transmitting/receiving antennas 101 are amplified in the amplifying sections 102. The transmitting/receiving sections 103 receive the UL signals amplified in the amplifying sections 102. The received signals are converted into the baseband signal through frequency conversion in the transmitting/receiving sections 103 and output to the baseband signal processing section 104.

In the baseband signal processing section 104, UL data that is included in the UL signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base station 10 and manages the radio resources.

The communication path interface section 106 transmits and receives signals to and from the higher station apparatus 30 via a predetermined interface. Also, the communication path interface 106 may transmit and receive signals (backhaul signaling) with neighboring radio base stations 10 via an inter-base station interface (which is, for example, optical fiber in compliance with the CPRI (Common Public Radio Interface), the X2 interface, etc.).

In addition, the transmitting/receiving sections 103 transmit a UL grant (DCI) that schedules a UL shared channel (for example, the PUSCH). In addition, the transmitting/receiving sections 103 receive the UL shared channel. In addition, the transmitting/receiving sections 103 transmit retransmission control information in response to the UL shared channel. This retransmission control information may be included in a UL grant, or transmitted in the PHICH.

In addition, the transmitting/receiving sections 103 may transmit information that represents the reference value k for the timing for transmission in the radio base station 10 and/or user terminals 20 and/or the retransmission control scheme (third aspect).

Figure 17:
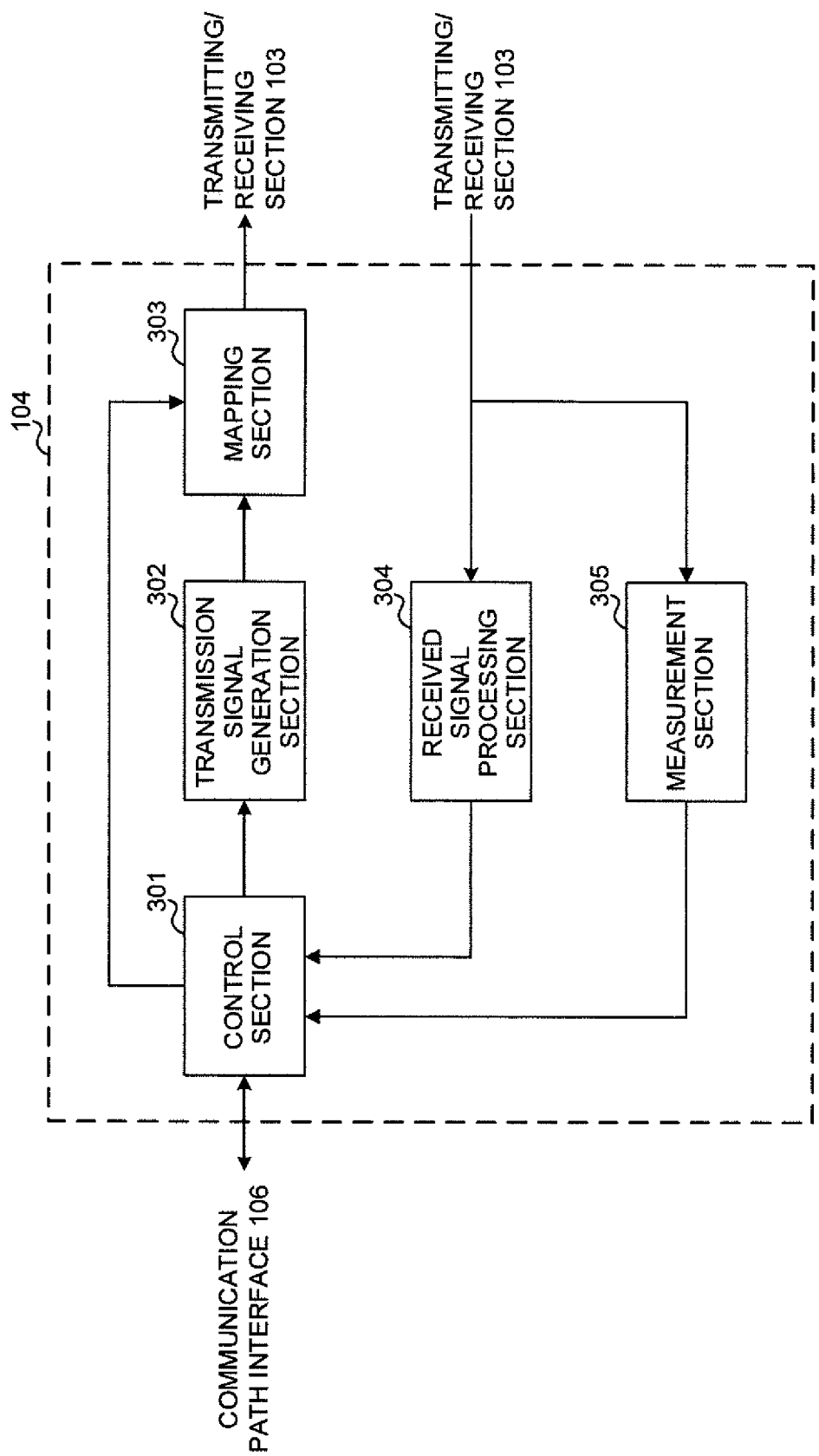
FIG. 17 is a diagram to show an exemplary functional structure of a radio base station according to the present embodiment.

FIG. 17 is a diagram to show an exemplary functional structure of a radio base station according to the present embodiment. Note that, although FIG. 17 primarily shows functional blocks that pertain to characteristic parts of the present embodiment, the radio base station 10 has other functional blocks that are necessary for radio communication as well. As shown in FIG. 17, the baseband signal processing section 104 at least has a control section 301, a transmission signal generation section 302, a mapping section 303, a received signal processing section 304 and a measurement section 305.

The control section 301 controls the whole of the radio base station 10. The control section 301 controls, for example, generation of DL signals in the transmission signal generation section 302, mapping of DL signals in the mapping section 303, receiving processes (for example, demodulation) for UL signals in the received signal processing section 304, and measurements in the measurement section 305.

To be more specific, the control section 301 performs scheduling for user terminals 20. For example, the control section 301 schedules the PUSCH and/or the PUSCH for the user terminals 20. Also, the control section 301 may control the reference value k in the radio base station 10 and/or the user terminals 20, and control the timing for scheduling this PUSCH based on this reference value k (first and second aspects).

In the event FDD is used, the control section 301 may schedule the PUSCH of subframe #n by using the UL grant of subframe #n−k (in other words, the control section 301 may schedule the PUSCH of subframe #n+k by using the UL grant of subframe #n) (first aspect).

In the event TDD is used, the control section 301 may control the timing for PUSCH scheduling based on the reference value k and UL/DL configurations (second aspect). In the event of TDD, the control section 301 may schedule the PUSCH of subframe #n by using the UL grant of subframe #n−k' (in other words, the control section 301 may schedule the PUSCH of subframe #n+k' by using the UL grant of subframe #n).

Here, k' is determined based on the reference value k (for example, k=1, 2, 3 or 4) and the UL/DL configuration (see, for example, FIG. 3A, FIG. 6A, FIG. 7A, FIG. 8A, FIG. 10, FIG. 11 and FIG. 12). The control section 301 may switch the table for looking up the value of k' when the reference value k changes.

Also, the control section 301 may control the maximum number of HARQ processes based on the reference value k (first and second aspect). Note that a UL grant that allocates a PUSCH may include an HPN field that indicates an HPN, and the bit length of the HPN field may be an unfixed value that varies with the maximum number of HARQ processes, or may be a fixed value that does not vary with the maximum number of processes.

Also, the control section 301 may control the retransmission of PUSCH. To be more specific, the control 301 may exert control so that retransmission control information in response to PUSCH is transmitted based on a synchronous scheme or an asynchronous scheme. These PUSCH retransmission control schemes may be associated with reference values k.

Furthermore, the control section 301 may also control aperiodic CSI reporting. To be more specific, the control section 301 exerts control so that the CSI request field value to include in a UL grant is determined, and this UL grant to contain a CSI request field value is generated and transmitted.

The control section 301 can be constituted by a controller, a control circuit or control apparatus that can be described based on general understanding of the technical field to which the present invention pertains.

The transmission signal generation section 302 generates DL signals (including DL data, scheduling information and sTTI configuration information) based on commands from the control section 301, and outputs these to the mapping section 303.

The transmission signal generation section 302 can be constituted by a signal generator, a signal generating circuit or signal generating apparatus that can be described based on general understanding of the technical field to which the present invention pertains.

Based on commands from the control section 301, the mapping section 303 maps the DL signals generated in the transmission signal generation section 302 (for example, DL data, DCI, UL data retransmission control information and so on) to predetermined radio resources, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and/or other processes) on UL signals (for example, UL data, UCI and so forth) transmitted from the user terminals 20. To be more specific, the received to signal processing section 304 performs receiving processes on UL signals based on the numerology configured in the user terminals 20. To be more specific, the received signal processing section 304 may output the received signals and/or the signals after receiving processes to the measurement section 305. In addition, the received signal processing section 304 performs receiving processes on A/Ns in response to DL signals, and outputs ACKs or NACKs to the control section 301.

The measurement section 305 conducts measurements with respect to the received signals. The measurement section 305 can be constituted by a measurer, a measurement circuit or measurement apparatus that can be described based on general understanding of the technical field to which the present invention pertains.

The measurement section 305 may measure UL channel quality based on, for example, the received power (for example, RSRP (Reference Signal Received Power)) and/or the received quality (for example, RSRQ (Reference Signal Received Quality)) of UL reference signals. The measurement results may be output to the control section 301.

(User Terminal)

Figure 18:
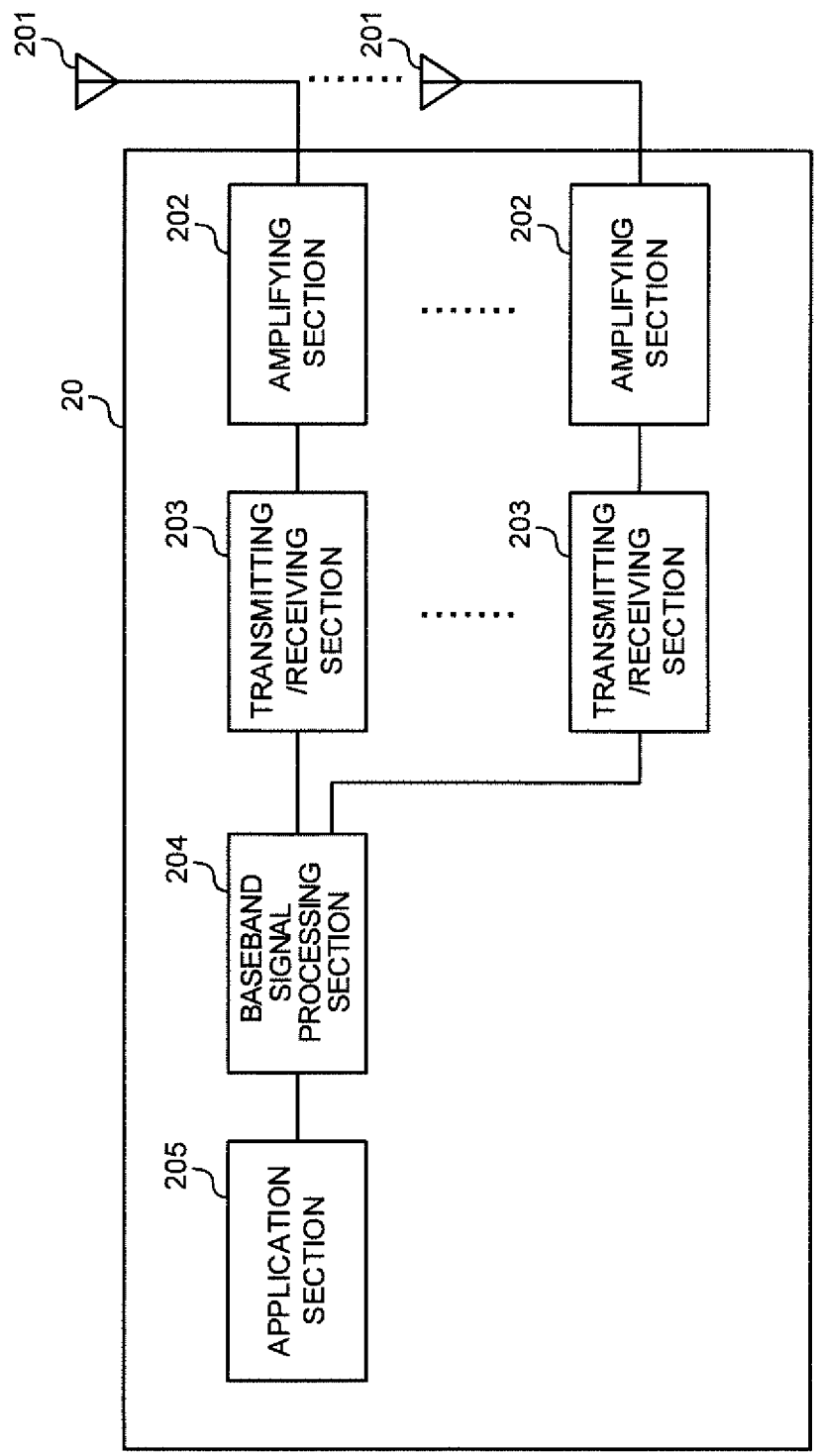
FIG. 18 is a diagram to show an exemplary overall structure of a user terminal according to the present embodiment.

FIG. 18 is a diagram to show an exemplary overall structure of a user terminal according to the present embodiment. A user terminal 20 has a plurality of transmitting/receiving antennas 201 for MIMO communication, amplifying sections 202, transmitting/receiving sections 203, a baseband signal processing section 204 and an application section 205.

Radio frequency signals that are received in multiple transmitting/receiving antennas 201 are amplified in the amplifying sections 202. The transmitting/receiving sections 203 receive DL signals amplified in the amplifying sections 202. The received signals are subjected to frequency conversion and converted into the baseband signal in the transmitting/receiving sections 203, and output to the baseband signal processing section 204.

In the baseband signal processing section 204, the baseband signal that is input is subjected to at least one of an FFT process, error correction decoding, a retransmission control receiving process and so on. The DL data is forwarded to the application section 205. The application section 205 performs processes related to higher layers above the physical layer and the MAC layer. Also, the broadcast information is also forwarded to application section 205.

Meanwhile, UL data is input from the application section 205 to the baseband signal processing section 204. The baseband signal processing section 204 performs transmission processes for retransmission control (for example, an HARQ transmission process), channel coding, rate matching, puncturing, a discrete Fourier transform (DFT) process, an IFFT process and so on, and the result is forwarded to each transmitting/receiving section 203. UCI (for example, at least one of DL retransmission control information, CSI and an SR) is also subjected to channel coding, rate matching, puncturing, a DFT process, an IFFT process and so on, and forwarded to each transmitting/receiving section 203.

Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

In addition, the transmitting/receiving sections 203 transmit UCI to the radio base station 10 by using a UL shared channel (for example, PUSCH) or a UL control channel (for example, PUCCH).

Also, the transmitting/receiving sections 203 receive a UL grant (DCI) that schedules the UL shared channel (for example, PUSCH). In addition, the transmitting/receiving sections 203 transmit the UL shared channel following commands from the control section 401. Furthermore, the transmitting/receiving sections 203 receive retransmission control information for the UL shared channel. This retransmission control information may be included in the above UL grant or transmitted in the PHICH.

Also, the transmitting/receiving sections 203 may receive information that represents the reference value k for the timing for transmission in the radio base station 10 and/or user terminals 20 and/or the retransmission control scheme (third aspect).

A transmitting/receiving section 203 can be constituted by a transmitter/receiver, a transmitting/receiving circuit or transmitting/receiving apparatus that can be described based on general understanding of the technical field to which the present invention pertains. Furthermore, a transmitting/receiving section 203 may be structured as one transmitting/receiving section, or may be formed with a transmitting section and a receiving section.

Figure 19:
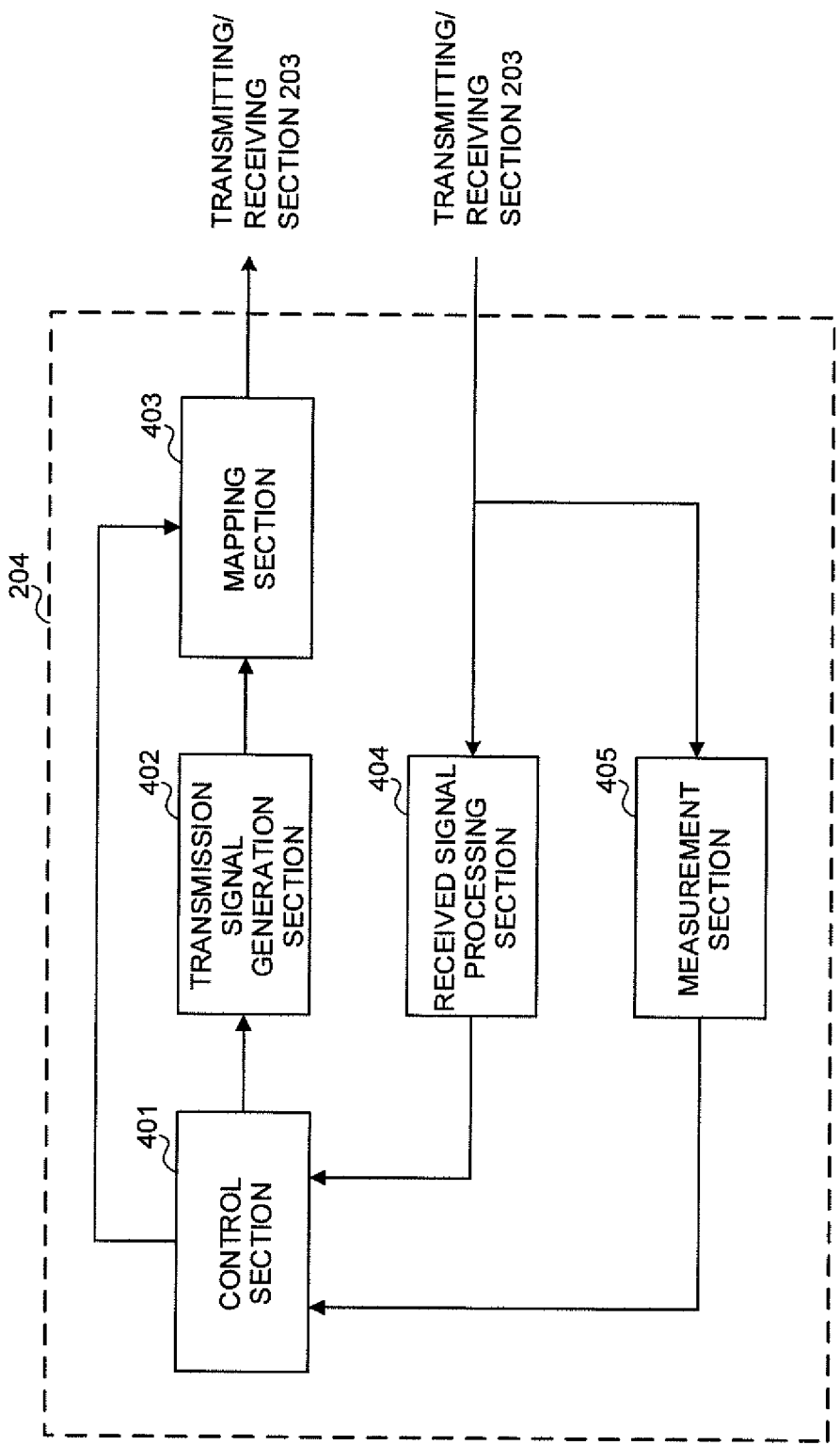
FIG. 19 is a diagram to show an exemplary functional structure of a user terminal according to the present embodiment.

FIG. 19 is a diagram to show an exemplary functional structure of a user terminal according to the present embodiment. Note that, although FIG. 19 primarily shows functional blocks that pertain to characteristic parts of the present embodiment, the user terminal 20 has other functional blocks that are necessary for radio communication as well. As shown in FIG. 19, the baseband signal processing section 204 provided in the user terminal 20 has a control section 401, a transmission signal generation section 402, a mapping section 403, a received signal processing section 404 and a measurement section 405.

The control section 401 controls the whole of the user terminal 20. The control section 401 controls, for example, the generation of UL signals in the transmission signal generation section 402, the mapping of UL signals in the mapping section 403, the DL signal receiving processes in the received signal processing section 404, the measurements in the measurement section 405 and so on.

The control section 401 controls receipt of PDSCH and/or transmission of PUSCH based on DCI from the radio base station 10. Also, the control section 401 may control the reference value k in the radio base station 10 and/or user terminals 20, and control the transmission of PUSCH, which is scheduled at a timing (scheduling timing) that is determined based on this reference value k (first and second aspects).

In the event FDD is used, the control section 401 may control the transmission of the PUSCH of subframe #n based on the UL grant of subframe #n−k (in other words, the control section 401 may control the transmission of the PUSCH of subframe #n+k by using the UL grant of subframe #n) (first aspect).

In the event TDD is used, the control section 401 may control the transmission of the PUSCH based on the UL grant of a timing (scheduling timing) that is determined based on the reference value k and the UL/DL configuration (second aspect). In the event TDD is used, the control section 401 may control the transmission of the PUSCH of subframe #n based on the UL grant of subframe #n−k' (in other words, the control section 401 may control the transmission of the PUSCH of subframe #n+k' by using the UL grant of subframe #n).

Here, k' is determined based on the reference value k (for example, k=1, 2, 3 or 4) and the UL/DL configuration (see, for example, FIG. 3A, FIG. 6A, FIG. 7A, FIG. 8A, FIG. 10, FIG. 11 and FIG. 12). The control section 401 may switch the table for looking up the value of k' when the reference value k changes.

Also, the control section 401 may control the maximum number of HARQ processes based on the reference value k (first and second aspect). Note that a UL grant that allocates a PUSCH may include an HPN field that indicates an HPN, and the bit length of the HPN field may be an unfixed value that varies with the maximum number of HARQ processes, or may be a fixed value that does not vary with the maximum number of processes.

In addition, the control section 401 may control the retransmission of the PUSCH based on the above reference value k. When a synchronous scheme is used in FDD, the control section 401 may detect retransmission control information in response to the PUSCH of subframe #n in the PHICH or the UL grant in subframe #n+k. When an asynchronous scheme is used in FDD, the control section 401 may detect retransmission control information in response to the PUSCH of subframe #n in the UL grant in or after subframe #n+k. When an asynchronous scheme is used, the retransmission control information includes an NDI and an HPN.

Also, when a synchronous scheme is used in TDD, the control section 401 may detect retransmission control information in response to the PUSCH of subframe #n in the PHICH or the UL grant of subframe #n+k'. When an asynchronous scheme is used in FDD, the control section 401 may detect retransmission control information in response to the PUSCH of subframe #n in the UL grant in or after subframe #n+k'. When an asynchronous scheme is used, the retransmission control information includes an NDI and an HPN.

Here, k' to use in retransmission control is determined based on the reference value k (for example, k=1, 2, 3 or 4) and the UUDL configuration. The control section 401 may switch the table for looking up the value of k' when the reference value k changes.

In addition, the control section 401 may control aperiodic CSI reporting based on the above reference value k. To be more specific, when a UL grant including a CSI request field value is received, the control section 401 exerts control so that UCI including aperiodic CSI is generated and transmitted based on this CSI request field value. The timing for reporting aperiodic CSI can be controlled in the same way as the above-described PUSCH transmission.

The control section 401 can be constituted by a controller, a control circuit or control apparatus that can be described based on general understanding of the technical field to which the present invention pertains.

The transmission signal generation section 402 generates UL signals (including UL data, UCI, UL reference signals and so forth) as commanded from the control section 401 (the generation collectively referring to, for example, performing processes such as encoding, rate matching, puncturing, modulation, and/or other processes), and outputs these to the mapping section 403. The transmission signal generation section 402 can be constituted by a signal generator, a signal generating circuit or signal generating apparatus that can be described based on general understanding of the technical field to which the present invention pertains.

The mapping section 403 maps the UL signals generated in the transmission signal generation section 402 to radio resources, as commanded from the control section 401, and outputs these to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so forth) for DL signals (DL data, DCI, higher layer control information, and so on). The received signal processing section 404 outputs the information received from the radio base station 10, to the control section 401. The received signal processing section 404 outputs, for example, broadcast information, system information, high layer control information related to higher layer signaling such as RRC signaling, physical layer control information (L1/L2 control information) and so on, to the control section 401.

The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The measurement section 405 measures channel states based on reference signals (for example, CRS and/or CSI- RS) from the radio base station 10, and outputs the measurement results to the control section 401.

The measurement section 405 can be constituted by a signal processor, a signal processing circuit or signal processing apparatus, and a measurer, a measurement circuit or measurement apparatus that can be described based on general understanding of the technical field to which the present invention pertains.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire and/or wireless, for example) and using these multiple pieces of apparatus.

Figure 20:
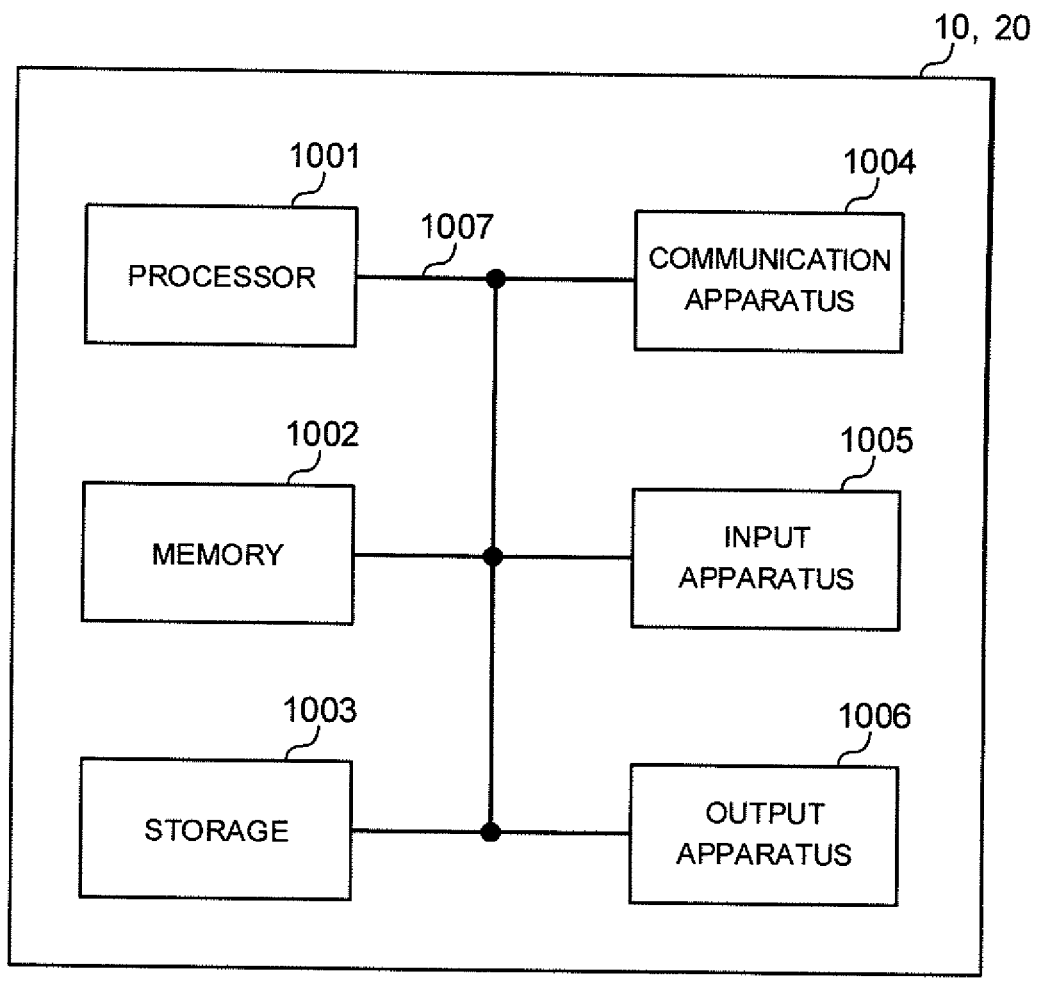
FIG. 20 is a diagram to show an exemplary hardware structure of a radio base station and a user terminal according to the present embodiment.

That is, a radio base station, a user terminal and so on according to an embodiment of the present invention may function as a computer that executes the processes of the radio communication method of the present invention. FIG. 20 is a diagram to show an exemplary hardware structure of a radio base station and a user terminal according to the present embodiment. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented in sequence, or in different manners, on one or more processors. Note that the processor 1001 may be implemented with one or more chips.

The functions of the radio base station 10 and the user terminal 20 are implemented by allowing hardware such as the processor 1001 and the memory 1002 to read predetermined software (programs), thereby allowing the processor 1001 to do calculations, the communication apparatus 1004 to communicate, and the memory 1002 and the storage 1003 to read and/or write data.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules, data and so forth from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) and so on. The memory 1002 can store executable programs (program codes), software modules and so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving apparatus) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these types of apparatus, including the processor 1001, the memory 1002 and others, are connected by a bus 1007 for communicating information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals" (or "signaling"). Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. A slot may be comprised of one or more symbols in the time domain (OFDM (Orthogonal Frequency Division Multiplexing) symbols, SC-FDMA (Single Carrier Frequency Division Multiple Access) symbols, and so on).

A radio frame, a subframe, a slot and a symbol all represent the time unit to use when communicating signals. A radio frame, a subframe, a slot and a symbol may be each called by other equivalent names. For example, one subframe may be referred to as a "transmission time interval (TTI)," or a plurality of consecutive subframes may be referred to as a "TTI," or one slot may be referred to as a "TTI." That is, a subframe and a TTI may be a subframe (1 ms) in existing LTE, may be a shorter period than 1 ms (for example, one to thirteen symbols), or may be a longer period of time than 1 ms.

Here, a TTI refers to the minimum time unit of scheduling in radio communication, for example. For example, in LTE systems, a radio base station schedules the allocation of radio resources (such as the frequency bandwidth and/or the transmission power that can be used by each user terminal) for each user terminal in TTI units. Note that the definition of TTIs is not limited to this. TTIs may be transmission time units for channel-encoded data packets (transport blocks), or may be the unit of processing in scheduling, link adaptation and so on.

A TTI having a time length of 1 ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," a "short TTI," a "shortened subframe," a "short subframe," and so on.

A resource block (RB) is the unit of resource allocation in the time domain and the frequency domain, and may include one or a plurality of consecutive subcarriers in the frequency domain. Also, an RB may include one or more symbols in the time domain, and may be one slot, one subframe or one TTI long. One TTI and one subframe may be each comprised of one or more resource blocks. Note that an RB may be referred to as a "physical resource block (PRB (Physical RB))," a "PRB pair," an "RB pair," and so on.

Furthermore, a resource block may be comprised of one or more resource elements (REs). For example, one RE may be a radio resource field of one subcarrier and one symbol.

Note that the structures of radio frames, subframes, slots, symbols and so on described above are merely examples. For example, configurations such as the number of subframes included in a radio frame, the number of slots included in a subframe, the number of symbols and RBs included in a slot, the number of subcarriers included in an RB, the number of symbols in a TTI, the duration of symbols and the duration of cyclic prefixes (CPs) can be changed in a variety of ways.

Also, the information and parameters described in this specification may be represented in absolute values or in relative values with respect to predetermined values, or may be represented in other information formats. For example, radio resources may be specified by predetermined indices. In addition, equations to use these parameters and so on may be used, apart from those explicitly disclosed in this specification.

The names used for parameters and so on in this specification are in no respect limiting. For example, since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and/or output via a plurality of network nodes.

The information, signals and so on that are input and/or output may be stored in a specific location (for example, a memory), or may be managed using a management table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the aspects/embodiments described in this specification, and other methods may be used as well. For example, reporting of information may be implemented by using physical layer signaling (for example, downlink control information (DCI), uplink control information (UCI)), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information, or by reporting a different piece of information). Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a structure in which communication between a radio base station and a user terminal is replaced with communication among a plurality of user terminals (D2D (Device-to-Device)). In this case, user terminals 20 may have the functions of the radio base stations 10 described above. In addition, terms such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by higher nodes (upper nodes). In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark) and other adequate radio communication methods, and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used only for convenience, as a method of distinguishing between two or more elements. In this way, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination thereof. For example, "connection" may be interpreted as "access." As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in radio frequency regions, microwave regions and/or optical regions (both visible and invisible).

When terms such as "include," "comprise" and other variations of these terms are used in this specification or in claims, such terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The disclosures of Japanese Patent Application No. 2016-170059, filed on Aug. 31, 2016, and Japanese Patent Application No. 2016-192332, filed on Sep. 29, 2016, including the specifications, drawings and abstracts, are incorporated herein by reference in their entirety.

The invention claimed is:

1. A terminal comprising:
 a receiver that receives downlink control information (DCI); and
 a processor that controls transmission of a physical uplink shared channel (PUSCH) that is scheduled by the DCI,
 wherein the processor controls the transmission of the PUSCH based on a reference value that is configured for timing for transmitting the PUSCH based on information provided through higher layer signaling,
 the DCI includes a Hybrid Automatic Repeat Request (HARQ) process number field indicating a process number that is assigned to the PUSCH, and
 a bit length of the HARQ process number field is a fixed value that does not vary with a maximum number of HARQ processes, and
 wherein the processor controls retransmission of the PUSCH in response to information included in the DCI that indicates whether the PUSCH comprises initially transmitted data.

2. The terminal according to claim 1, wherein the processor controls the maximum number of HARQ processes to use to control retransmission of the PUSCH, based on the reference value.

3. The terminal according to claim 2, wherein the processor controls retransmission of the PUSCH by using a synchronous scheme or an asynchronous scheme, depending on the reference value.

4. The terminal according to claim 1, wherein the processor controls retransmission of the PUSCH by using a synchronous scheme or an asynchronous scheme, depending on the reference value.

5. The terminal according to claim 4, wherein the processor controls the reference value based on information indicating at least one of the reference value through higher layer signaling and physical layer signaling, or based on a value of the process number field.

6. A radio communication method for a terminal, comprising:
 receiving downlink control information (DCI); and
 controlling transmission of a physical uplink shared channel (PUSCH) that is scheduled by the DCI,
 wherein the terminal controls the transmission of the PUSCH based on a reference value that is configured for timing for transmitting the PUSCH based on information provided through higher layer signaling,
 the DCI includes a Hybrid Automatic Repeat Request (HARQ) process number field indicating a process number that is assigned to the PUSCH, and
 a bit length of the HARQ process number field is a fixed value that does not vary with a maximum number of HARQ processes, and
 wherein the terminal controls retransmission of the PUSCH in response to information included in the DCI that indicates whether the PUSCH comprises initially transmitted data.

* * * * *